(12) United States Patent
Ryan et al.

(10) Patent No.: US 12,252,355 B2
(45) Date of Patent: Mar. 18, 2025

(54) ROBOTIC SINGULATION SYSTEM SENSOR

(71) Applicant: Dexterity, Inc., Redwood City, CA (US)

(72) Inventors: Timothy Ryan, San Francisco, CA (US); Zhouwen Sun, Redwood City, CA (US); Harry Zhe Su, Union City, CA (US); Talbot Morris-Downing, Redwood City, CA (US); David Leo Tondreau, III, San Francisco, CA (US); Toby Leonard Baker, East Palo Alto, CA (US); Ayush Sharma, Santa Clara, CA (US); Raphael Georg Wirth, Breisach (DE)

(73) Assignee: Dexterity, Inc., Redwood City, CA (US)

( * ) Notice: Subject to any disclaimer, the term of this patent is extended or adjusted under 35 U.S.C. 154(b) by 379 days.

(21) Appl. No.: 17/696,238

(22) Filed: Mar. 16, 2022

(65) Prior Publication Data
US 2022/0315358 A1    Oct. 6, 2022

Related U.S. Application Data

(60) Provisional application No. 63/163,671, filed on Mar. 19, 2021.

(51) Int. Cl.
*B65G 47/91*    (2006.01)
*B25J 9/16*    (2006.01)

(52) U.S. Cl.
CPC .......... *B65G 47/917* (2013.01); *B25J 9/1653* (2013.01); *B25J 9/1664* (2013.01); *B25J 9/1697* (2013.01);
(Continued)

(58) Field of Classification Search
CPC .......... B65G 47/917; B65G 2203/0216; B65G 2203/0283; B65G 2203/041; B65G 2203/046; B25J 9/1653; B25J 9/1664; B25J 9/1697; B25J 9/0093; B25J 19/027; B25J 19/023; G05B 19/128; G05B 2219/39102; G05B 2219/49302; G05B 19/4183;
(Continued)

(56) References Cited

U.S. PATENT DOCUMENTS 9,830,485 B1 * 11/2017 Lecky .................. G06Q 10/087
10,906,188 B1    2/2021 Sun
(Continued)

OTHER PUBLICATIONS

Bolotnyy et al., "The Case for Multi-Tag RFID Systems", IEEE, 2007, retrieved on [Nov. 5, 2022]. Retrieved from the internet <URL: https://ieeexplore.ieee.org/document/4288229>.
(Continued)

*Primary Examiner* — Kamini S Shah
*Assistant Examiner* — Mohammed Shafayet
(74) *Attorney, Agent, or Firm* — Van Pelt, Yi & James LLP

(57) ABSTRACT

A robotic system comprising an end effector-mounted sensor is disclosed. In various embodiments, a robotic arm is manipulated to move a sensor to a position such that an object of interest is within a read range of the sensor. A sensor data read by the sensor is received via a communication interface. The sensor data is used to determine an attribute of the object; and the determined attribute of the object is used to determine a plan to grasp and move the object.

13 Claims, 16 Drawing Sheets

(52) U.S. Cl.
CPC ............... *B65G 2203/0216* (2013.01); *B65G 2203/0283* (2013.01); *B65G 2203/041* (2013.01); *B65G 2203/046* (2013.01)

(58) Field of Classification Search
CPC ...... G05B 19/41865; B07C 2501/0063; B07C 1/04; B07C 5/36
See application file for complete search history.

(56) References Cited

U.S. PATENT DOCUMENTS

| | | | |
|---|---|---|---|
| 2002/0150450 A1 | 10/2002 | Bevirt | |
| 2007/0061041 A1* | 3/2007 | Zweig | G05D 1/0261 700/245 |
| 2010/0328073 A1* | 12/2010 | Nikitin | G06K 7/0008 340/572.1 |
| 2011/0050400 A1* | 3/2011 | Ho | G06K 7/10029 340/10.42 |
| 2015/0081090 A1* | 3/2015 | Dong | G06T 19/20 700/230 |
| 2018/0218185 A1* | 8/2018 | High | G06Q 10/087 |
| 2019/0337723 A1* | 11/2019 | Wagner | B65G 1/1376 |
| 2020/0242544 A1* | 7/2020 | Galluzzo | B25J 9/1692 |
| 2020/0269432 A1* | 8/2020 | Beinhofer | B25J 19/023 |
| 2020/0363259 A1 | 11/2020 | Bergstra | |
| 2021/0053216 A1* | 2/2021 | Diankov | B25J 9/1669 |

OTHER PUBLICATIONS

Sahu et al., "Multiple Sensor Integrated Robotic End-effectors for Assembly", ScienceDirect, 2014, retrieved on [Jun. 5, 2022]. Retrieved from the internet <URL: https://www.sciencedirect.com/science/article/pii/S2212017314000504.

Qiu et al. Patl: A RFID Tag Localization based on Phased Array Antenna. Scientific Rports. Mar. 15, 2017.

* cited by examiner

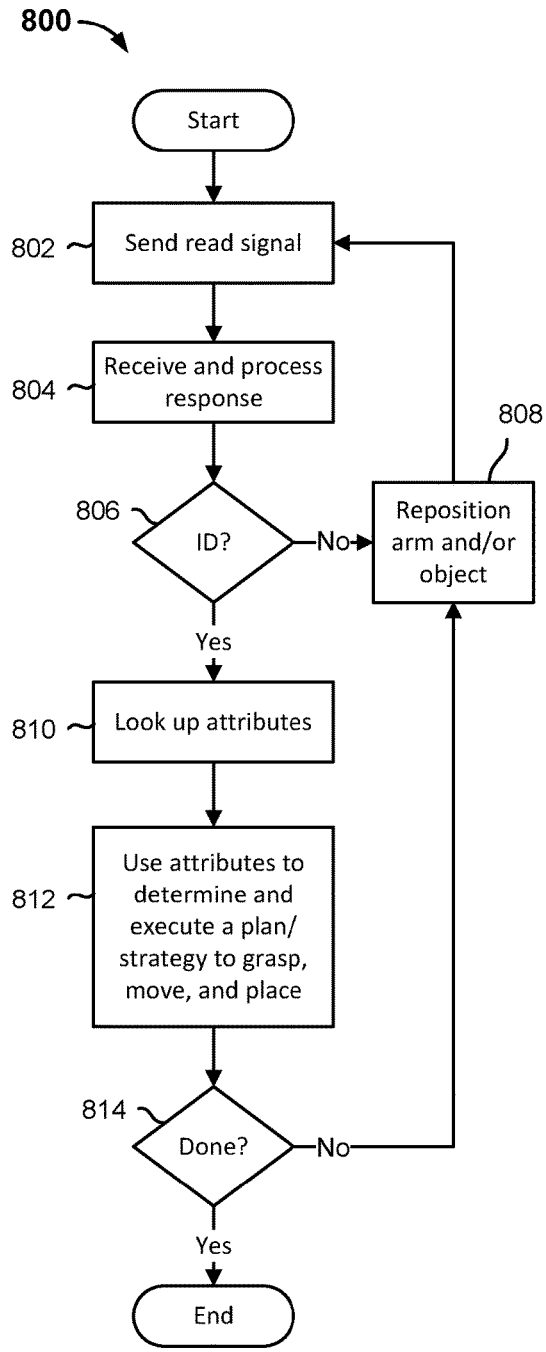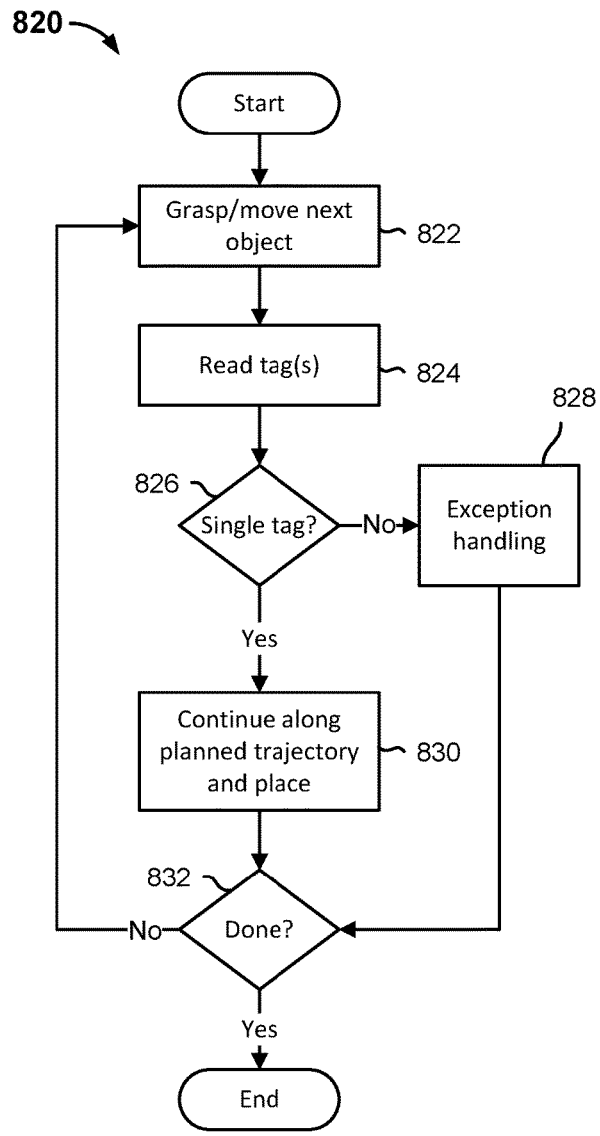
FIG. 8A
FIG. 8B

ROBOTIC SINGULATION SYSTEM SENSOR

CROSS REFERENCE TO OTHER APPLICATIONS

This application claims priority to U.S. Provisional Patent Application No. 63/163,671 entitled ROBOTIC SINGULATION SYSTEM SENSOR filed Mar. 19, 2021 which is incorporated herein by reference for all purposes.

BACKGROUND OF THE INVENTION

Parcel and other distribution centers may receive an arbitrary mix of items of various sizes, dimensions, shape, weight, rigidity, and/or other attributes, often in a cluttered arbitrary mix. Each item may have machine readable information, such as text and/or optically or otherwise encoded information, which can be machine read and used to route the item, e.g., via an automated sorting/routing system and/or processing. To read the information for a given item, in a typical approach the items are separated from one another via a process known as "singulation."

Typically, singulation has been performed manually by human workers. A mix of items arrives at a workstation, e.g., via a chute or other conveyance, and each of a set of one or more human workers manually separates items and places them in a defined space for a single item on a conveyor belt or the like. For each item, its destination (or at least next leg of transport) is determined by machine-reading information on the item, and the item is routed to a destination associated with the next leg, such as a bag, bin, container, or other receptacle and/or a delivery vehicle or staging area associated with the next leg.

Manual singulation processes are labor-intensive and can be inefficient. For example, a downstream human worker may have few locations on which to place singulated items, e.g., as a result of upstream workers filling many of the single item spots. Collective throughput may be suboptimal.

Use of robots to perform singulation is challenging due to the arrival of a cluttered mix of items at a workstation, the dynamic flow of items at each station and overall, and the result that it may be difficult to identify, grasp, separate (singulate) items using a robotic arm and end effector in an automated manner, and to adapt to changing states or conditions with respect to the workstation or the items therein.

BRIEF DESCRIPTION OF THE DRAWINGS

Various embodiments of the invention are disclosed in the following detailed description and the accompanying drawings.

FIG. 8A is a flow diagram illustrating an embodiment of a process to use an end effector-based sensor to perform singulation.

FIG. 8B is a flow diagram illustrating an embodiment of a process to use an end effector-based sensor to detect the presence of more than one item.

DETAILED DESCRIPTION

Figure 1:
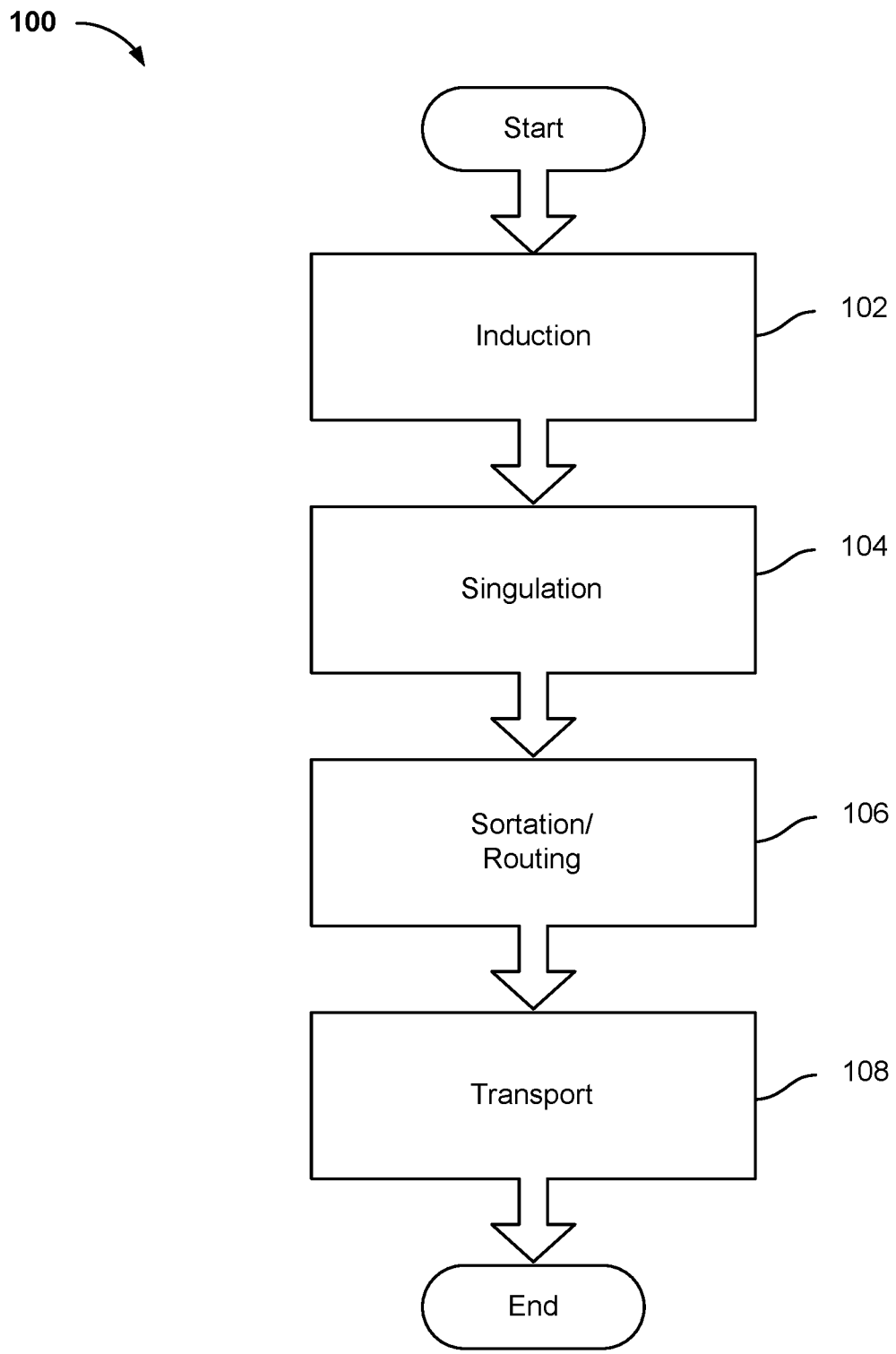
FIG. 1 is a flow diagram illustrating a process to receive, sort, and transport items for distribution and delivery.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system to perform singulation is disclosed. In various embodiments, singulation is performed based on data associated with a workspace or an item within the workspace. A plan (e.g., to singulate an item) is determined based at least in part on an attribute of an item in the workspace. The attribute of the item may be determined based at least in part on the sensor data obtained with respect to the workspace. As used herein, a workspace may include a chute or other conveyance structure and/or receptacle on which a source pile/flow of items is disposed, a destination conveyance structure on which an item from the chute is to be singly placed, and a robotic structure that includes a robotic arm that picks one or more items from the chute (or other source) and places the one or more items singly, each in a corresponding location on the destination conveyance structure. The workspace can further include a control computer that obtains sensor data associated with the workspace, and/or an on-demand teleoperation device that a human operator can use to control an element within the workspace such as the robotic arm and/or the conveyance structure. As used herein, the term slot or tray may be used interchangeably in connection with describing a particular location on the conveyor.

A robotic system includes a robotic arm and end effector used to pick items from a source pile/flow and place them on a segmented conveyor or similar conveyance to be sorted and routed for transport to a downstream (e.g., ultimate addressed/physical) destination. As used herein, singulating an item includes picking an item from a source pile/flow and placing the item singly on or in a destination, such as a location on a destination conveyance structure (e.g., a segmented conveyor or similar conveyance). In some embodiments, multiple robots are coordinated to implement a desired collective throughput. In various embodiments, one or more robots may be employed at a singulation station. A robotic system may include multiple stations. As an example, each station can correspond to a distinct workspace (e.g., a distinct chute comprising the source pile/flow). Human workers may be employed at one or more stations. The robotic system in various embodiments may be configured to invoke (request) the assistance of a human worker, e.g., by teleoperation of a robotic arm, manual task completion, etc., for example to handle an item the robot cannot handle by fully automated processing and/or an item the robot has dropped, etc. In some embodiments, a plurality of robotic arms operating at the same workspace work independently to singulate the plurality of items. In connection with the singulation of an item, a plan or strategy can be determined for singulating the item from the source pile/flow at which the item is located to a corresponding location on the conveyor. The corresponding location on the conveyor can be a particular slot or tray on the conveyor. In some embodiments, a slot or tray on the conveyor is associated with an identifier (e.g., a unique identifier with respect to the conveyor within the robotic system).

According to various embodiments, the plan or strategy includes an indication of an item (e.g., from the source pile/flow) to be singulated, a location on the conveyor at which the item is to be singly placed, and a path or trajectory along which the item is to be moved from the source pile/flow to the location on the conveyor. The plan or strategy includes information pertaining to the location on the conveyor at which the item is to be singly placed, such as an identifier of a slot or tray on the conveyor in which the item is to be placed. In some embodiments the plan or strategy includes instructions that the robotic structure that is to singulate the item uses in order to singulate the item. As an example, the instructions provide an indication of the manner according to which the robotic structure is to control the corresponding robotic arm to pick the item from the chute, to move the item along the path or trajectory, and to place the item at the determined location on the conveyor.

The path or trajectory along which an item is to be singulated is determined according to various embodiments based at least in part on sensor data. The robotic system may obtain a plurality of sensors that output information pertaining to the workspace, including the items or objects within the workspace. The sensor data is obtained based on the information output from one or more sensors and used in connection with determining the path or trajectory. In some embodiments, the path or trajectory is determined based at least in part on one or more attributes of the item to be singulated. Examples of attributes of the item include a weight, a size (e.g., one or more dimensions), a type of packaging, an identifier on the item, a location of an identifier or label on the item, a location of the item relative to the chute and/or conveyor, information obtained from the identifier or label on the item, etc. Various other attributes can be used in connection with determining the path or trajectory. Determination of the path or trajectory of the item may be further based at least in part on a location on the conveyor at which the item is to be placed, an attribute of an item(s) already on the conveyor, an attribute of an item within the workspace (e.g., an item within the source pile/flow), a grip strength with which the robotic arm has grasped the item, a speed with which the robotic arm is to move the item, etc.

According to various embodiments, a set of paths or trajectories for singulating an item is determined, and the path or trajectory along which the item is to be singulated is selected from the set of paths or trajectories. The path or trajectory can be selected based on various properties associated with the corresponding paths or trajectories within the set. Examples of the properties associated with the corresponding paths or trajectories that may be used in connection with selecting the path or trajectory include a speed with which the item is to be singulated, a location on the conveyor in which the item is to be singulated, a probability of success that the item is to be singulated according to the particular path or trajectory, an indication of whether another item or object within the workspace intersects with the particular path or trajectory, etc. In some embodiments, the probability of success that the item is to be singulated according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

Various embodiments include a system and process for configuring the robotic system to detect an empty slot or tray on the conveyor. Through normal use over time, one or more properties of a slot or tray on the conveyor may change. For example, a side or surface of the slot or tray may change color or have visible scratches/scuffing. As another example, one or more dimensions of a slot or tray may change as a result of relatively oversized/overweight items being placed and carried in the slot or tray. If the appearance or dimensions (or other properties) of the slot or tray changes over time, the robotic system may err in determining whether the slot/tray is empty (and available to carry an item to be singulated). The robotic system may determine that a slot/tray is empty because the slot/tray appears different from the definition of what an empty slot/tray looks like (e.g., different color, scratches, or other markings on the surfaces, etc.). Accordingly, in some embodiments, the definition of an empty tray (e.g., a mapping of one or more properties of an empty tray) is updated over time. The updating of the definition of the empty tray can be performed periodically at predetermined time intervals, or in response to detecting one or more conditions being satisfied (e.g., an error rate threshold being attained by the robotic system). In various embodiments, the definition of the empty tray is continuously updated. For example, the system data obtains sensor data pertaining to a vision system that is captured with respect to a slot or tray at a location on the conveyor where the slot or tray is deemed to be empty (e.g., at the beginning of the conveyor, or at the end of the conveyor after a step where the slot or tray is emptied), and uses the sensor data to update the definition of the empty tray. In some embodiments, the definition of an empty slot or tray is determined on a tray-by-tray basis such that each slot or tray has a corresponding definition of such slot or tray. The definition for a particular slot or tray can be stored in association with a corresponding identifier for such slot or tray. The updating of the definition of an empty slot/tray can be implemented using a machine learning process.

According to various embodiments, a robotic singulation system performs an active measure in order to improve the singulation of an item (e.g., to successfully pick the item from a source pile/flow and place the item on the conveyor). The robotic system dynamically updates the path or trajectory of the item during singulation based on a context of the workspace (e.g., a state or condition of the item, a property of the item, another item within the workspace, etc.). For example, in response to determining that a detected state or condition impedes implementation of a current plan to autonomously operate the robotic structure to pick one or more items from the workspace and place each item singly in a corresponding location in a singulation conveyance structure, the robotic structure performs one or more active measures to improve the likelihood of successful singulation (e.g., the robotic structure can determine an active measure that is expected to improve the likelihood of successful singulation based at least in part on the detected state or condition). In some embodiments, the active measure includes using a robotic arm, an end effector of the robotic arm, a movement of a chute or other element of the workspace, or an air blower to reconfigure the source pile/flow or to reconfigure one or more items or debris on the workspace. The active measure can be performed to improve a scanning of a label or identifier on an item to be singulated, to improve the likelihood that an item can be picked up, to improve the grip on an item being singulated, to improve the release of an item from the robotic arm, or to improve operation of two robotic arms that are independently singulating items from the same workspace (e.g., the same source pile/flow).

Parcel carriers, postal services, delivery services, large retailers or distributors, and other enterprise and government entities that handle, transport, and deliver items to and from diverse locations typically receive large quantities of items from various source locations, each to be delivered to a corresponding one of a variety of destination locations.

Machines exist to handle, sort, and route items, but to use machine readers and sorting equipment items may need to be spaced from one another and/or in a certain orientation to be able to have a label or tag read by a machine. Such spacing and orientation may need to be achieved in the course of a process of "induction" of items into a sorting/routing facility, and may be performed in connection with a "sorting" or "sortation" process, for example, a process by which items to be delivered to diverse locations are sorted by general destination (e.g., region, state, city, zip code, street, street number order, etc.).

Machine readers, such as radio-frequency (RF) tag readers, optical code readers, etc., may need items to be space apart from one another, a process sometimes referred to as "singulation," to be able to reliably read a tag or code and for the system to associate the resulting information with a specific item, such as an item in a specific location on a conveyor or other structure or instrumentality.

In a typical induction/sortation process in a parcel sorting operation, for example, individual parcels may be picked from bulk piles and placed onto a moving conveyor or tilt tray sortation system. For most facilities, induction of this type is entirely manual.

A typical, manual parcel induction/sortation process may include one or more of the following:
  A chute with unsorted parcels filters down onto a sorting table adjacent to a conveyor-based sortation system
  A worker's job is to "singulate" the items onto the conveyor or tray-based sortation system
  Workers ensure that every parcel which is inducted onto the sorter is oriented such that a shipping barcode (or other optical code, electronic tag, etc.) can be read for sortation purposes (this orientation typically is determined by the scanning infrastructure at the facility)
  Wait for an empty tray or slot to pass, and ensure that only one parcel is placed on each slot or tray In a typical manual induction/sortation process, manually (or machine) fed chutes via which parcels of a variety of shapes and sizes arrive in bulk in various orientations; parcels may have different dimensions, shapes, rigidity, packaging, etc.; typically human workers take packages from a chute feeding a station at which each works and places them one by one on an open partitioned or otherwise defined segment of a conveyor; finally, many workers each at a station populate locations on one or more conveyors with singulated parcels, to facilitate downstream machine processing, such as reading the code or tag and taking automated sorting action based thereon, such as routing each parcel to a location within the facility that is associated with a destination to which the parcel is to be delivered. The location may involve further sorting (e.g., more destination-specific location within the facility) and/or packing/loading the parcel for further shipment (e.g., truck or aircraft to further destination where further sorting and delivery will occur, loading on a truck for local delivery, etc.).

A robotic singulation system comprising an end effector equipped with one or more sensors to detect, identify, and discern between adjacent or overlapping parcels or other objects is disclosed. In various embodiments, a robotic system as disclosed herein comprises an end effector having one or more sensors integrated with and/or mounted thereon. Examples include, without limitation, passive and/or active radiofrequency (RF) tag readers, cameras or other imaging devices, and/or other near field and/or relatively shorter-range sensors.

FIG. 1 is a flow diagram illustrating a process to receive, sort, and transport items for distribution and delivery.

In the example shown, process 100 begins with an induction process 102 by which items are provided to one or more workstations for singulation via singulation process 104. In various embodiments, the singulation process 104 is at least partly automated by a robotic singulation system as disclosed herein. The singulation process 104 receives piles or flows of dissimilar items via induction process 102 and provides a stream of singulated items to a sortation/routing process 106. For example, the singulation process 104 may place items one by one on a segmented conveyor or other structure that feeds items one by one into a sortation/routing machine. In some embodiments, items are placed with an orientation such that a label or tag is able to be read by a downstream reader configured to read routing (e.g., destination address) information and use the routing information to sort the item to a corresponding destination, such as a pile, bin, or other set of items destined for the same next intermediate and/or final destination. Once sorted, groups of items heading to a common next/final destination are processed by a transport process 108. For example, items may be placed in containers, loaded into delivery or transport trucks or other vehicles, etc., for delivery to the next/final destination.

A robotic system configured to determine a plan that takes into consideration an attribute of the item to be singulated and/or an attribute of another item within the workspace (e.g., an item on the conveyor) is disclosed. The related process 100 of FIG. 1 further fails to disclose that the attribute of the item to be singulated and/or the attribute of the item within the workspace is determined based at least in part on sensor data. In various embodiments, a plan for singulating an item is determined (and implemented) to avoid collisions between the item being singulated and another item in the workspace and/or an object in the workspace. The plan may be determined based on a determination of an expected collision and an active measure that is to be implemented to avoid the expected collision. Various embodiments determine a plan to facilitate improvement in the efficiency of paths or trajectories in connection with singulating an item and/or to improve the effectiveness of the singulation of items (e.g., the items may not be properly placed on the conveyor, a label may not be read by a sensor in the system in connection with singulating the item, etc.). According to various embodiments, singulation of items from a source pile/flow is improved through the use of a dynamic singulation method or system that determines a path or trajectory for singulation of an item using one or more of an attribute of the item to be singulated and an attribute of another item within the workspace (e.g., an item on the conveyor). The dynamic singulation method or system can include an updating of the path or trajectory for singulation of an item in response to detecting one or more of an attribute of the item to be singulated and an attribute of another item within the workspace (e.g., an item on the conveyor).

Figure 2A:
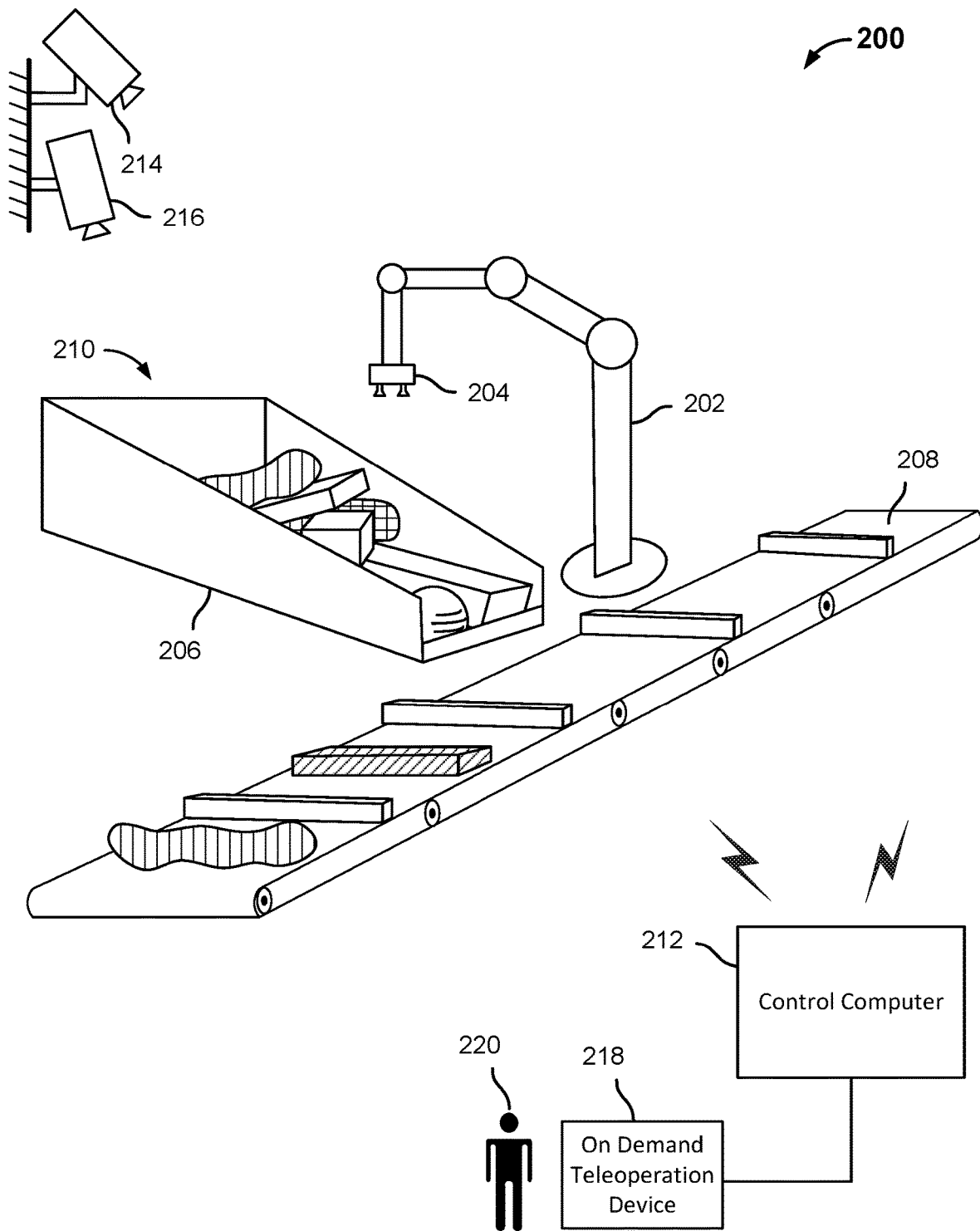
FIG. 2A is a diagram illustrating a robotic singulation system according to various embodiments.

FIG. 2A is a diagram illustrating a robotic singulation system according to various embodiments.

In the example shown, system 200 includes a robotic arm 202 equipped with a suction-based end effector 204. While in the example shown the end effector 204 is a suction-based end effector, in various embodiments, one or more other types of end effectors may be used in a singulation system as disclosed herein, including without limitation a pinch-based end effector or other types of actuated grippers. In some embodiments, end effector 204 comprises one or more suction-based ends (e.g., one or more suction cups). In various embodiments, the end effector may be actuated by one or more of suction, air pressure, pneumatics, hydraulics, or other actuation. Robotic arm 202 and end effector 204 are configured to be used to retrieve parcels or other items that arrive via chute or bin 206 and place each item in a corresponding location on segmented conveyor 208. In this example, items are fed into chute 206 from an intake end 210. For example, one or more human and/or robotic workers may feed items into intake end 210 of chute 206, either directly or via a conveyor or other electro-mechanical structure configured to feed items into chute 206.

In the example shown, one or more of robotic arm 202, end effector 204, and conveyor 208 are operated in coordination by control computer 212. In some implementations, control computer 212 is configured to control a plurality of robotic arms operating at one or more workstations. In various embodiments, a robotic singulation as disclosed herein may include one or more sensors from which an environment of the workspace is modeled. In the example shown in FIG. 2A, system 200 includes image sensors, including in this example 3D cameras 214 and 216. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 212 includes a workspace environment state system such as a vision system used to discern individual items, debris on the workspace, and each item's orientation based on sensor data such as image data provided by image sensors, including in this example 3D cameras 214 and 216. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace.

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 208. In some embodiments, the workspace environment state system produces an output (e.g., sensor data or information otherwise characterizing the workspace and/or items within the workspace) used by the robotic system to detect a state, condition, and/or attribute associated with one or more items in the workspace, and/or a state or condition associated with the robotic arm or other element of the workspace. According to various embodiments, in response to detecting (e.g., determining) the state, condition, and/or attribute associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan can include operating the robotic structure to change or adapt to the detected state, condition, and/or attribute (e.g., implement a change or manner by which an item is singulated, change a path or trajectory along which the item is singulated, change a manner by which the item is grasped, change a location on the item at which the item is grasped, etc.).

In various embodiments, a robotic system as disclosed herein includes and/or does one or more of the following, e.g., by operation of a control computer such as control computer 212:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system determines characteristics of items and/or debris or other abnormalities in the three-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system coordinates operation of a plurality of robots operating within a same workspace to singulate a plurality of items. For example, in various embodiments, the plurality of robots operate independently to pick and place items. If a risk of collision is detected, responsive action is taken to ensure the plurality of robots do not collide with one another during singulation.

Robotic system coordinates operation of multiple robots to ensure all items are placed and only one per slot/location. For example, if robot A drops an item, the system tasks robot B to pick it up; item placed but with improper orientation is picked up and adjusted or moved to another location by the same or another robot; two or more items in a single destination slot result in the robot downstream station picking one of the two or more items off the conveyor and placing the item in a new location; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system may manage the independent operation of a plurality of robots to ensure that the robots select items at different times to avoid the same item being selected for singulation by two different robots.

The robotic system may analyze all possible robotic arm-objects combinations and attempts to find a suitable pair. If no pair is found, then the best item for a particular robot (e.g., the primary robot) is selected as the item to be singulated by the particular robot. If there is no item for the particular robot (e.g., the particular robot) we default to an item for the secondary bot.

Conveyor movement and/or speed is controlled as needed to avoid empty locations and achieve a desired robot productivity (throughput)

In response to a determination that an item is misplaced or dropped, the system assigns a robot or, if needed, a human worker to pick it up and place it back in the retrieving robot's own source pile or, if available or more optimal, on a next open slot on the conveyor.

Upstream robots are controlled to intentionally leave some slots open for downstream robots to place items on the conveyor.

Downstream robots are controlled to correct errors from an upstream robot placing an item on the conveyor (e.g., to correct the placement of an item that rests in more than one slot/tray, to update a data structure with an association between an identifier for the item with the slot in which the upstream robot placed the item, etc.).

Failure that cannot be corrected by the same or another robot results in an alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or reconfigure an item to be singulated (e.g., to improve the likelihood that the item is successfully picked from the source pile/flow and placed on the conveyance structure).

Control a chute conveyor to reconfigure items within the workspace (e.g., to bring an item selected for singulation closer to a front of the chute for quicker and easier access by the robotic arm, to reposition one or more items to improve the ability of a robotic arm to grasp an item, etc.).

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics (e.g., attributes) of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, and determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Select a path for singulating an item on the conveyance structure based on an attribute of the item (e.g., a size of the selected item, a weight of the item, etc.) and/or one or more attributes (e.g., characteristics) of an item within a slot on the conveyance structure. For example, a path is determined to place the item in a slot that is adjacent to a slot comprising a tall or large item.

Determine a movement and speed of the robotic arm that singulates an item based at least in part on a speed of a conveyor belt.

Determine a trajectory of the item to be singulated based at least in part on one or more of a characteristic of the item, a characteristic of the workspace environment, and/or a characteristic of the conveyance structure (e.g., a speed of the conveyor belt).

Determine a probability of successful singulation corresponding to one or more paths/trajectories of an item to be singulated, and select a path/trajectory along which the item is to be singulated based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector to be orthogonal to a surface of the item.

Update the ability of the robotic system to detect an empty slot or tray. For example, the definition of an empty slot/tray used by the robotic system to identify an empty slot/tray is updated over time.

In various embodiments, an arbitrary mix of items to be singulated may include parcels, packages, and/or letters of a variety of shapes and sizes. Some items may be standard packages, one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal. According to various embodiments, in response to determining that the item is relatively heavy (e.g., that the weight exceeds a predefined threshold) and that the item is packaged in a polybag, or in response to determining that tenting is being caused while grasping the item, the robotic structure performs an active measure to change or adapt to the "tenting" or to the determination of the type the packaging of the item. As an example, the robotic structure performs an active measure to partially lift the package and drag the package from the chute to the corresponding slot in the conveyance structure.

The robotic system may determine a path or trajectory (or a trajectory of the robotic arm/end effector in approaching the item for grasp) based on a type of packaging of the item in order to avoid tenting or to otherwise improve a grasping of the item. As an example, the robotic arm (e.g., a wrist) and/or the end effector is controlled to be orthogonal to a surface of the item from which the item is grasped. As another example, the path or trajectory of the robotic arm and/or end effector can be determined to knock an item over or otherwise reposition the item before grasping the item.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving of the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc. In some embodiments, the image data is used to determine a characteristic (e.g., an attribute) of one or more items in the workspace. As an example, the image data can be used in connection with determining (e.g., estimating) a height or dimension of an item.

The multiple cameras serve many purposes, in various embodiments. First they provide a richer full 3D view into the scene. Next they operate in cohesion to minimize the errors due to package shininess when light reflecting off a package and into a camera may disrupt its operation; in this case another camera at a different location provides a backup. In some embodiments, they can be selectively triggered by a predictive vision algorithm that determines which camera has the best viewing angle and/or lowest error rate for picking a particular package; as such each package has the optimal camera looking at it. In some embodiments, one or more cameras are mounted on an actuated base, of which the system can change the position and orientation to provide a more optimal perception (e.g., view) of a package. In some embodiments, one or more cameras are mounted on the robotic structure (e.g., on the end effector of the robotic arm, etc.).

Another purpose served by cameras is, in various embodiments, to detect any sort of unforeseen error in robot operation or any disruption to the environment. Cameras placed on the robot and on the environment have different error and accuracy profiles. The cameras on the robot can be more accurate since they are rigidly fixed to the robot but slower to use because use of such cameras requires the robot to slow down or stall. Cameras in the environment have a stable view and are effectively faster because the robot can multi-task and do something else while a camera is taking a photo. But if someone moves or shakes the camera stand, the cameras may become out of sync with the robot and cause errors. In various embodiments, images from robot and non-robot cameras are combined (e.g., occasionally or on a package miss) to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some such embodiments gyros and/or accelerometers on the cameras may be used to filter or compensate for the motion of the mounting base.

According to various embodiments, system 200 may include one or more sensors other than or in addition to a plurality of cameras, such as one or more of an infrared sensor array, a laser array, a scale, a gyroscope, a current sensor, a voltage sensor, a power sensor, and the like. Information received from the various other sensors is used in determining one or more attributes of the item to be singulated and/or attributes of another item or object within the workspace, etc.

Referring to FIG. 2A, in various embodiments, robotic arm 202 is to be driven by one or more motors, e.g., one or more motors at each movable joint or mount location. In some embodiments, the work required to drive robotic arm 202 (e.g., to move the robotic arm as the robotic arm attempts to singulate an item) is indicative of one or more characteristics of the item to be singulated. For example, in some embodiments, a weight of the item may be computed (or estimated) based on the work required to drive the robotic arm 202 while the item is in its grasp. In various embodiments, the work required to drive the robotic arm 202 is measured using a current sensor, a voltage sensor, a power sensor, and/or the like, or some combination thereof. In response to determining the weight of the item during singulation, the robotic system determines a path/trajectory of an item to be singulated based at least in part on the weight of the item. The robotic system may perform an active measure to adapt to the weight of the item such as, for example, updating the path or trajectory in response to determining the weight of the item. In some embodiments, in response to determining that the weight of the item is greater than a predefined threshold, robotic system 200 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, the robotic structure adjusts the speed at which the robotic arm (and the item) is moved. For example, the larger the weight of the item, the greater the shear forces are between the item and end effector 204 as the robotic arm 202 is moved. Further, the shear forces can increase as the speed at which the robotic arm is operated increases (e.g., the speed at which the robotic arm moves the item). Accordingly, robotic system 200 can control the speed of the robotic arm 202 based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm 202 or the end effector 204. However, force sensors are relatively expensive and thus low-level hardware information, such as motor torque or a measure of the work used by the motor is an effective manner by which to determine (e.g., estimate) the weight of the item.

Information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace. The information received from the one or more sensor arrays may be used in connection with determining a height of the item to be singulated and/or another item or other object within the workspace. In some embodiments, the robotic system determines a path or trajectory (or updates the path or trajectory) based at least in part on height of the item to be singulated and/or another item or other object within the workspace. For example, the robotic system determines a location on the conveyor at which the item is to be placed based at least in part on a height (or other dimension) of one or more other items on the conveyor. Planning to place an item in a slot/tray adjacent to another slot/tray comprising a relatively large (e.g., tall, wide, etc.) item can increase the likelihood of a collision during singulation. In addition, a relatively large item on the conveyor can impede the ability of the robotic system to obtain information for adjacent items. The line of sight of the vision system may be blocked by a relatively large item and thus the sensor data may not include accurate information for adjacent items (or other items within close proximity to the large item). As another example, if the item includes an identifier or label on a side facing a relatively large item, or on a surface close to the large item, the vision system may be unable to locate or read the identifier or label.

Referring further to FIG. 2A, in the example shown, system 200 further includes an on-demand teleoperation device 218 usable by a human worker 220 to operate one or more of robotic arm 202, end effector 204, and conveyor 208 by teleoperation. In some embodiments, control computer 212 is configured to attempt to grasp and place items in a fully automated mode. However, if after attempting to operate in fully automated mode control computer 212 determines it has no (further) strategies available to grasp one or more items, in various embodiments, control computer 212 sends an alert to obtain assistance from a human operator via teleoperation, e.g., by human operator 220 using teleoperation device 218. For example, in some embodiments, in response to detecting a state or condition affecting item flow through chute 206, control computer 212 may attempt to perform one or more actions to facilitate singulation. If fully automated attempts to respond to the detected state or condition are determined not to have resolved the state or condition, control computer 212 may prompt human operator 220 to address the state or condition, e.g., via teleoperation using on-demand teleoperation device 218. In various embodiments, control computer 212 may display a user interface or other interface that identifies the state or condition and/or presents human selectable options to control the robotic arm 202, end effector 204, and/or other elements and instrumentalities as disclosed herein (e.g., blowers, shakers, chute conveyors, etc.) to alter the state or condition.

In various embodiments, control computer 212 uses image data from cameras such as cameras 214 and 216 to provide a visual display of the scene to human worker 220 to facilitate teleoperation. For example, control computer 212 may display a view of the pile of items in chute 206. In some embodiments, segmentation processing is performed by control computer 212 on image data generated by cameras 214 and 216 to discern item/object boundaries. Masking techniques may be used to highlight individual items, e.g., using different colors. The operator 220 may use the visual display of the scene to identify the item(s) to be grasped and use teleoperation device 218 to control the robotic arm 202 and end effector 204 to pick the item(s) from chute 206 and place each in a corresponding location on conveyor 208. In various embodiments, once the item(s) for which human intervention was prompted have been placed on the conveyor, the system 200 resumes fully automated operation. In various embodiments, in the event of human intervention, the robotic system observes the human worker (e.g., manual task completion, task completion using a robotic arm and end effector via teleoperation) and attempts to learn a strategy to (better) complete the task in an autonomous mode in the future. For example, the system may learn a strategy to grasp an item, e.g., by observing the places on the item at which a human worker grasps the item and/or by remembering how the human worker used the robotic arm and end effector to grasp the item via teleoperation.

In some embodiments, system 200 invokes assistance from human operator 220 in response to determining that an abnormality in the operation of system 200 exists. An example of an abnormality is a lack of a threshold pressure being attained between end effector 204 and the item during singulation of the item. In response to detecting that the pressure attained between end effector 204 and the item is less than a threshold pressure value, robot system 200 can perform a diagnostics process in connection with assessing whether robot system 200 is performing normally. For example, system 200 can perform a diagnostic of the ability of end effector 204 to engage an item and attain a predetermined threshold pressure value. In response to determining that system 200 is not performing normally (e.g., that the end effector 204 is not able to engage an item and attain a predetermined threshold pressure value), system 200 invokes assistance from human operator 220. In some embodiments, control computer 212 sends an alert to human operator 220. The alert can indicate the basis of the problem (e.g., an indication that the end effector is unable to engage the item and attain a predetermined threshold pressure value). For example, the alert can provide a recommended or requested remedial action to human operator 220.

Figure 2B:
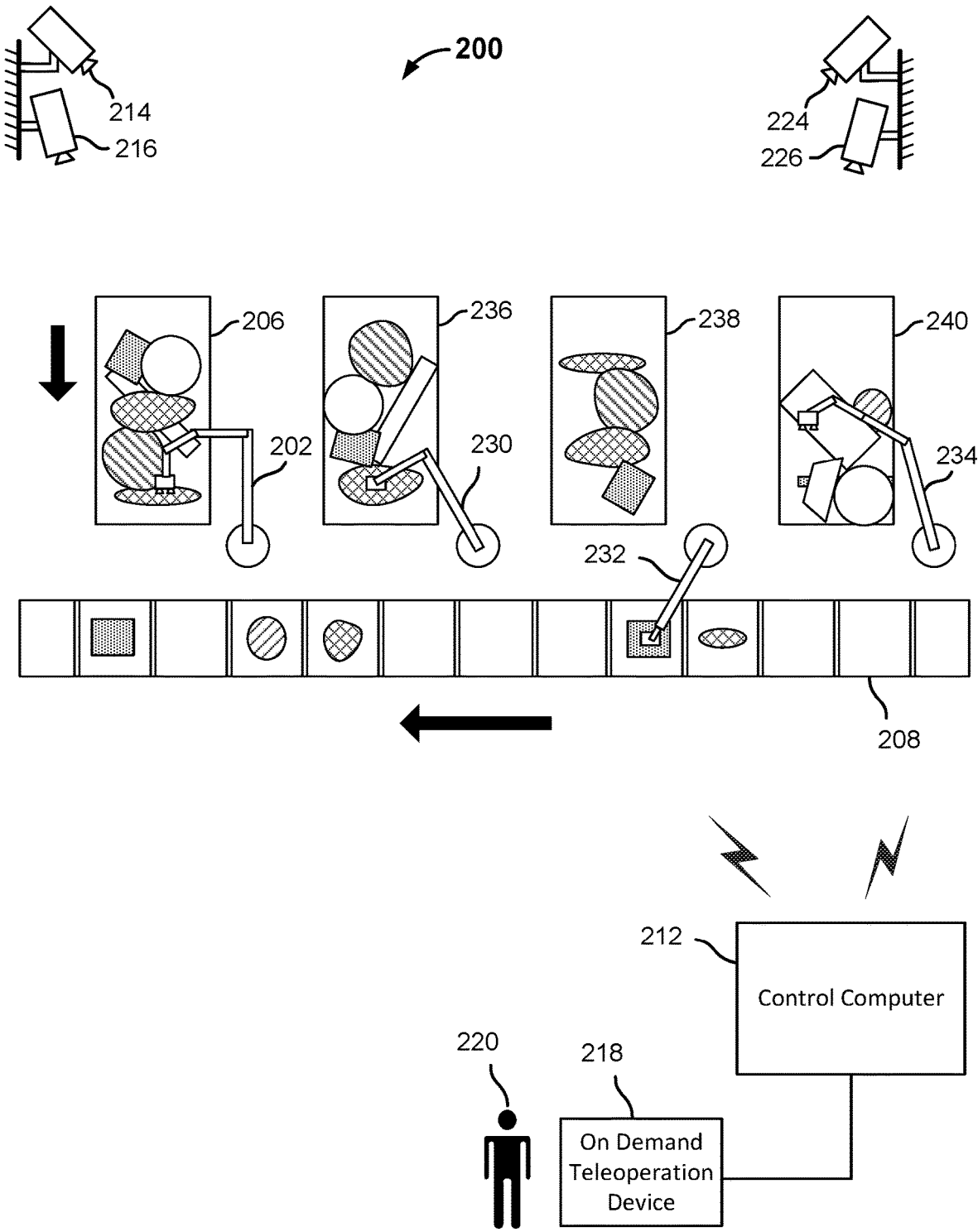
FIG. 2B is a diagram illustrating a robotic singulation system according to various embodiments.

FIG. 2B is a diagram illustrating a robotic singulation system according to various embodiments. In the example shown, the robotic singulation system of FIG. 2A has been expanded to include a plurality of singulation stations. Specifically, in addition to robotic arm 202 configured to pick items from chute 206 and place each item on a corresponding available and/or assigned location on segmented conveyor 208, the system shown in FIG. 2B includes three additional stations: robotic arms 230, 232, and 234 positioned and configured to pick/place items from chutes 236, 238, and 240, respectively. Additional cameras 224 and 226 are included, in addition to cameras 214 and 216, to provide a 3D view of the full scene, including each of the four stations/chutes 206, 236, 238, and 240, as well as conveyor 208.

In various embodiments, control computer 212 coordinates operation of the four robotic arms 202, 230, 232, and 234 and associated end effectors, along with conveyor 208, to pick/place items from the chutes 206, 236, 238, and 240 to conveyor 208 in a manner that achieves a desired collective throughput of the system (e.g., a collective throughput that satisfies a throughput threshold, etc.). The plan or trajectory of an item during singulation at one station can be determined based at least in part on an attribute of an item to be singulated at another station, or based at least in part on a plan or trajectory of an item to be singulated at the other station. For example, the path or trajectory of an item to be singulated can be determined so as to avoid a collision (e.g., intersect) with the path or trajectory of another item to be singulated.

While in the example shown in FIG. 2B each station has one robotic arm, in various embodiments two or more robots may be deployed at a station, operated under control of an associated control computer, such as control computer 212 in the example shown in FIG. 2B, in a manner that avoids the robots interfering with each other's operation and movement and which maximizes their collective throughput (or attains a desired collective throughput such as in relation to a collective throughput threshold), including by avoiding and/or managing contention to pick and place the same item. In some embodiments, a plurality of robotic arms operating at the same workspace work independently to singulate the plurality of items. One or more of the plurality of robotic arms can perform an active measure to avoid a collision between two robotic arms in response to detecting a collision or a potential for a collision between the two robotic arms. For example, control computer 212 can coordinate operation of the plurality of robots to enable the plurality of robots to operate independently while ensuring that the plurality of robots and/or the items grasped by the plurality of robots do not collide with one another during singulation. The active measure can include updating a plan for singulating the item, such as changing a path or trajectory along with an item to be singulated. As an example, the robots (or control computer 212) access information from which their respective positions and the positions of one or more other robots are determined, and the robots are controlled to avoid an intersection between their respective positions and the positions of the one or more other robots at a certain time. In some embodiments, a first robot reserves an airspace (e.g., a certain position) that is to be used by the first robot during singulation of an item. The airspace can include the path or trajectory along which the item is to be singulated. In connection with a second robot scheduling singulation of an item, the second robot determines the plan to singulate the item based at least in part on the airspace reserved by the first robot. For example, in connection with scheduling singulation of the item, the second robot determines that the plan cannot include movement through the airspace reserved by the first robot and the second robot determines a plan that does not require the second robot or the item to move through the airspace reserved by the first robot during the time at which the airspace is so reserved. The second robot determines a path or trajectory along which the second item is to be singulated based on the airspace reserved for singulation of the first item and/or an attribute of the second item or first item such as a size of the first item or second item.

In various embodiments, a scheduler coordinates operation of a plurality of robots, e.g., one or more robots working at each of a plurality of stations, to achieve desired throughput without conflict between robots, such as one robot placing an item in a location the scheduler has assigned to another robot. The desired throughput can be a collective throughput that exceeds a predetermined throughput threshold.

A robotic system as disclosed herein may coordinate operation of multiple robots to one by one pick items from a source bin or chute and place the items on an assigned location on a conveyor or other device to move items to the next stage of machine identification and/or sorting. In some embodiments, each of at least a subset of a plurality of robots working at a workspace picks an item independent from the other robots of the plurality of robots and a corresponding plan for singulation of the item is determined. The at least the subset of the plurality of robots can pick in a predefined order such that no two robots select or pick an item at the same time. Each of the at least the subset of the plurality of robots can select or pick an item based on items that are currently available at the time of such selection. Accordingly, a second robot of the at least two subset of the plurality of robots that picks after a first robot will select an item to singulate that is different from the item selected or picked by the first robot.

System 200 can include multiple robots that may pick from a same chute or other source receptacle. In the example shown in FIG. 2B, for example, robotic arm 202 may be configured to pick from either chute 206 or chute 236. Likewise, robotic arm 230 may pick from chute 236 or chute 238 and robotic arm 232 may pick from chute 238 or chute 240. In some embodiments, two or more robotic arms configured to pick from the same chute may have different end effectors. A robotic singulation system as disclosed herein may select the robotic arm most suitable to pick and singulate a given item. For example, the system determines which robotic arms can reach the item and selects one with the most appropriate end effector and/or other attributes to successfully grasp the item.

While stationary robotic arms are shown in FIG. 2B, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

According to various embodiments, a robotic singulation system as disclosed herein, such as system 200 of FIG. 2A or the multi-station system of FIG. 2B, manages a distributed data structure pertaining to the operation of one or more robots comprising the system and/or a state of the conveyance structure. For example, the distributed data structure may include one or more fields associated with each slot in the conveyance structure. According to various embodiments, the distributed data structure operates at a speed far in excess of the speed at which robots in the system operate. For example, the distributed data structure operates (e.g., is updated) on the order of 1 μs or 1 ms, and time at which the robots physically operate/move is on the order of 100 ms. In some embodiments, the control loop for a particular robot is substantially equal to, or on the order of, 800 Hz, and the control loop for the control computer (e.g., the dispatcher) sending targets to the robot is substantially equal to, or on the order of, 100 Hz. The data structure may be atomic in that if one robot is updating the status of a slot, then another robot will not be able to read that information until the write is complete. Accordingly, the distributed data structure can be updated based on operation of a robot or a plan for singulation associated with a robot. Because the speed at which the robots operate is slower than the speed at which the distributed data structure operates, the distributed data structure is updated to reflect changes in the state of the workspace (e.g., the state of the conveyance structure) relatively quickly and the distributed data structure is likely to have been updated with the latest state by the time the robotic obtains and/or uses information from the distributed data structure in connection with determining a plan/strategy for singulating an item (e.g., selecting/claiming a slot in the conveyor). In some implementations, the relative speed of the distributed data structure reduces the likelihood that two robots would claim a slot on the conveyor at the same time and cause a fault in the distributed data structure. Accordingly, the distributed data structure can be updated based on operation of a robot or a plan for singulation associated with a robot. In various embodiments, each (mostly) independently operated singulation robot comprising a system associated with an output conveyor updates the distributed data structure with information pertaining to a plan or with information pertaining to one or more characteristics associated with the workspace (e.g., whether a slot in the conveyor is occupied or claimed for use by a robot in the system as a planned destination to place an item on the conveyor). In some embodiments, if the robot receives an error in connection with an attempt to write information to the distributed data structure, e.g., to claim a slot on the conveyor for its use, the robot waits a predetermined interval and re-attempts to write such information to the distributed data structure. If the data cannot be written because another robot has already written data to that location, e.g., already claimed an associated slot on the output conveyor, the robot chooses another slot determined to be available by reading another location in the data structure. According to various embodiments, in response to the data structure being updated by one robot, the data structure is automatically updated with respect to one or more other robots within system 200. For example, in response to determining that an update (e.g., a write or delete operation) is performed, the update is distributed to the other robots within system 200. The data structure may be a shared data structure to which a plurality of robots within a system have access (e.g., to read, write, etc.). In some embodiments, a distributed data is hosted on one machine (e.g., computer system), and all robots within a system have an active network connection to that machine (e.g., computer system) and can individually read/write data (e.g., to the data structure). The information pertaining to the data structure may be stored on a server.

In various embodiments, a robot may update the distributed data structure with information pertaining to a plan or with information pertaining to one or more characteristics associated with the workspace (e.g., whether a slot is occupied). For example, in response to the robot updating a plan to singulate an item (e.g., the path or trajectory along which the item is to be singulated), the robot may update the distributed data structure with information pertaining to a plan or with information pertaining to one or more characteristics associated with the workspace. If the robot receives an error in connection with an attempt to write information to the distributed data structure, the robot can wait a predetermined interval and re-attempt to write such information to the distributed data structure. According to various embodiments, in response to the data structure being updated at one robot, the data structure is automatically updated on one or more other robots within system 200. For example, in response to determining that an update (e.g., a write or delete operation) is performed, the update is distributed to the other robots within system 200.

According to various embodiments, the distributed data structure comprises a field associated with a slot in the conveyance structure that is used to indicate whether the slot is occupied or reserved for an item in connection with singulation of the item by the robot. For example, a value in the field associated with a slot is indicative of whether the slot can be reserved or used by another robot for scheduling an item. In some embodiments, when a robot is determining (or updating) a plan to singulate an item, a slot on the conveyance structure is reserved. The slot in the conveyance structure is reserved based at least in part on the distributed data structure pertaining to the state of the conveyance structure. For example, a slot associated with a field indicating that the slot is empty or unreserved can be reserved for singulation of an item. Occasionally, a robot arm can erroneously release an item in a slot different from a slot that corresponded to the singulation plan, or in a manner that the item straddles two slots (e.g., adjacent slots). The corresponding robot (or a downstream robot) can detect that a slot has an item therein in contradiction to the corresponding field in the distributed data structure (e.g., such field indicating that the slot is empty or not reserved). In response to detecting that the slot has an item therein in contradiction to the corresponding field in the distributed data structure, the robot system updates the data structure to indicate that the slot is occupied or reserved.

According to various embodiments, the distributed data structure includes information pertaining to a timestamp, a speed of the conveyor, and one or more characteristics of a slot in the conveyor (e.g., an indication of whether the slot is occupied or reserved). The distributed data structure can include information pertaining to an attribute of one or more items within a slot or tray on the conveyor and/or an attribute of an item to be singulated by a robot within the robot system. The robot system can determine a plan for singulating an item from a source pile/flow to a slot in the conveyor based at least in part on the distributed data structure. For example, system 200 determines, based on the timestamp and the speed of the conveyor, a set of slots in which an item picked from the source pile/flow can be placed. System 200 can select a slot, from among the set of slots, that is empty or not reserved as a slot in which the item is to be singulated. The timestamp and the speed of the conveyor are used because system 200 can determine one or more slots with which the path or trajectory of the item being singulated can be caused to intersect based on operating the corresponding robot.

Figure 3:
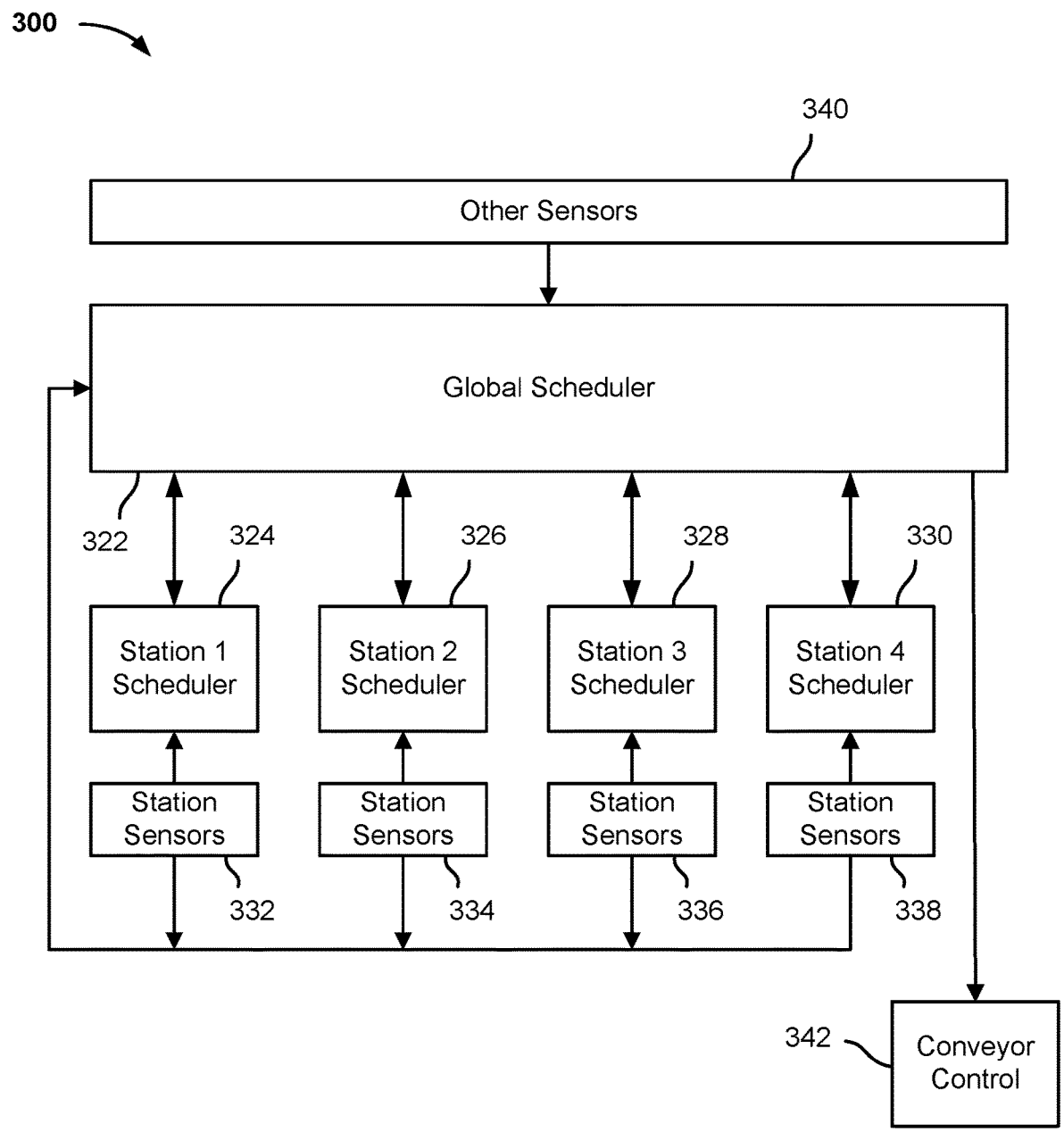
FIG. 3 is a diagram of a hierarchical scheduling system according to various embodiments of a robotic singulation system.

FIG. 3 is a diagram of a hierarchical scheduling system according to various embodiments of a robotic singulation system. In various embodiments, the hierarchical scheduling system 300 of FIG. 3 is implemented at least in part on a computer, such as control computer 212 of FIGS. 2A and 2B, control computer 512 of FIGS. 5A and 5B, control computer 815 of FIG. 8A, control computer 917 of FIG. 9, and control computer 1028 of FIG. 10A. In the example shown, hierarchical scheduling system 300 includes a global scheduler 322 configured to optimize throughput (or attain a desired throughput) by coordinating the operation of a plurality of robotic singulation stations and a segmented conveyor (or similar structure) on which the robotic singulation stations are configured to place items. According to various embodiments, the global schedule 322 is configured to coordinate operation of a plurality of robotic arms within a single workspace to ensure a desired throughput is attained while ensuring that the plurality of robots do not collide. Global scheduler 322 can be configured to implement an active measure in response to determining that a plurality of robotic arms (e.g., operating within a single workspace) have collided or are expected to collide (e.g., if the plurality of robots were to continue implementing their respective plans or strategies for singulating an item). The active measure can include causing one or more paths or trajectories of an item to be singulated by the plurality of robotic arms to be updated to ensure that the expected collision is avoided. Global scheduler 322 may be implemented as a processing module or other software entity running on a computer. The global scheduler supervises and coordinates work among the robotic singulation stations at least in part by monitoring and as needed controlling and/or otherwise providing input to a plurality of robotic singulation station schedulers 324, 326, 328, and 330.

In some embodiments, a robotic singulation station includes a single robotic arm that is controlled to singulate an item within a workspace, and a workspace can include a plurality of robotic singulation stations. In some embodiments, a robotic singulation station includes a plurality of robotic arms that are coordinated to singulate a plurality of items within a workspace. In some cases, if the robotic singulation station includes a plurality of robotic arms, a particular workspace can include a single robotic singulation station.

Each of the robotic singulation station schedulers 324, 326, 328, and 330 is associated with a corresponding robotic singulation station and each controls and coordinates the operation of one or more robotic arms and associated end effectors to pick items from a corresponding chute or other item receptacle and place them singly on a segmented conveyor or similar structure. Each of the robotic singulation station schedulers 324, 326, 328, and 330 is associated with a corresponding set of one or more station sensors 332, 334, 336, and 338, respectively, and each uses the sensor data generated by its station's sensors to perform automated singulation at its robotic singulation station. In some embodiments, each implements and performs process 400 of FIG. 4A, process 420a of FIG. 4B, process 420b of FIG. 4C, process 600 of FIG. 6, process 850 of FIG. 8B, process 875 of FIG. 8C, and process 1050 of FIG. 10B, and process 1075 of FIG. 10C.

In various embodiments, each of the robotic singulation station schedulers 324, 326, 328, and 330 reports to global scheduler 322 one or more of image and/or other station sensor data; object identification, grasp strategy, and success probability data; pick/place plan information; path or trajectory information; and expected item singulation throughput information. Global schedule 322 is configured to use information received from the robotic singulation station schedulers 324, 326, 328, and 330—along with sensor data received from other sensors 340, such as cameras pointed at the segmented conveyor and/or other parts of the workspace not covered or covered well or completely by the station sensors—to coordinate work by the respective robotic singulation stations, each under the control of its station-specific scheduler 324, 326, 328, and 330, and to control the operation (e.g., speed) of the segmented conveyor via conveyor controller 342, so as to optimize (e.g., maximize) the collective singulation throughput of the system.

In various embodiments, the global scheduler 322 employs one or more techniques to implement collision avoidance between a plurality of robots comprising the robotic singulation system while using the plurality of robots to perform singulation, e.g., to maximize overall throughput or to attain a desired overall throughput level. For example, a particular workspace can include a plurality of robots operating to singulate items within the particular workspace (e.g., the plurality of robots pick items from a same source pile/flow in a chute and singly place the respective items in corresponding slots of the conveyance structure). Because the workspace includes a plurality of robotic arms to singulate items therein, the robotic arms can have respective ranges of motion that overlap with each other. In some embodiments, the global scheduler 322 detects an expected collision event based at least in part on information received from the robotic singulation station schedulers 324, 326, 328, and 330—along with sensor data received from other sensors 340, such as cameras pointed at the segmented conveyor and/or other parts of the workspace not covered or covered well or completely by the station sensors—to coordinate work by the respective robotic singulation stations. According to various embodiments, global scheduler 322 may use the information received from the respective robotic singulation station schedulers 324, 326, 328, and 330 to determine locations of the plurality of robots and determine a probability that two of the plurality of robots will collide with each other or that a robot will collide with another object within the workspace at which the robot operates. For example, the global scheduler detects an expected collision event based at least in part on a location of at least one robot and a path or strategy (for singulating an item) for at least one robot. In some embodiments, the expected collision event is detected based on a determination that a location or path of a first robot (or item grasped by the first robot) is planned to intersect with a location or path of a second robot (or item grasped by the first robot) at a particular time.

In some embodiments, each robot operating in a workspace in which a plurality of robots pick items from a common source, such as the same chute, operates mostly independently to identify and grasp items to be picked by that robot from the source. Conflicts may be minimized or avoided by configuring each robot to pick from potentially overlapping assigned regions of the chute or other source. For example, each robot may pick (primarily) from the side of the chute nearest to that robot. Or, in some embodiments, one robot may be configured to pick (primarily) from the back of the chute (farthest from destination conveyor) and another from the front of the chute (nearest to the destination conveyor). In some embodiments, in the event of a detected (risk of) collision, each robot implements a random wait interval and resumes operation. If the different/random waits result in no risk of collision, both resume and continue operation. In some embodiments, a heuristic or logic may be applied to resolve/avoid collisions, such as by allowing the robot targeting an item further back in the chute to reach and grasp first, followed by the robot targeting an item nearer the front (i.e., nearer the destination conveyor). In some embodiments, the robot that picked from nearer to the end of the chute may move first to place its item, followed by the robot that grasped an item from farther back.

In some embodiments, the plurality of robots operating at a single workspace operate to implement respective processes to singulate items in parallel, and each of the plurality of robots contemporaneously operates to implement a particular step or set of steps in a sequence of steps of the respective processes to singulate items before either of the plurality of robots moves to the next step or set of steps in the sequence of steps. For example, each of the plurality of robots operate to pick an item from a source pile/flow and each of the plurality of robots wait until the other robot(s) correspondingly pick an item before progressing to the next step or sequence of steps in the process to singulate items from the workspace. As another example, each of the robots operate to move the items from the chute area from which an item was grasped to a particular location at the conveyance structure at which the item is to be placed, and each of the plurality of robots wait until the other robot(s) correspondingly move the items in their grasp to corresponding locations at the conveyance structure before progressing to the next step or sequence of steps in the process to singulate items (e.g., to place the items on the conveyance structure). In the foregoing manner, a plurality of robots operate independently to determine plans and strategies for singulating items within a workspace, however, the plurality of robots are coordinated in progressing through the singulation process. According to various embodiments, a collision event is detected based on a determination that a location or path of a first robot (or item grasped by the first robot) is planned to intersect with a location or path of a second robot (or item grasped by the first robot) at a particular step in a singulation sequence. In such a manner, a location or path of a robot is only used by a single robot during a particular step or set of steps in the singulation process.

According to various embodiments, the robotic singulation station schedulers 324, 326, 328, and 330 register with global scheduler 322 plans or strategies for operating corresponding robots to singulate items, or otherwise store such plans or strategies in a storage location that is accessible to global scheduler 322. The robotic singulation station schedulers 324, 326, 328, and 330 can independently determine the plans or strategies for operating corresponding robots to singulate items. In some embodiments, although the robotic singulation station schedulers 324, 326, 328, and 330 operate independently to determine their respective plans or strategies, the robotic singulation station schedulers 324, 326, 328, and 330 determine their respective plans or strategies at different times (e.g., so that a same item is not selected for singulation by two robots, etc.). In some embodiments, the robotic singulation station schedulers 324, 326, 328, and 330 operate independently to determine their respective plans or strategies, and the robotic singulation station schedulers 324, 326, 328, and 330 register with their respective plans or strategies global scheduler 322 at different times, and global scheduler 322 can send a fault to a robotic singulation station scheduler if during registration of its plan or strategy global scheduler 322 that such plan or strategy conflicts with an existing registered plan or strategy. Examples of instances in which plans or strategies are deemed to conflict include a plurality of plans or strategies pertaining to singulation of a same item from the workspace, a plurality of plans or strategies using a same path or trajectory, a plurality of plans or strategies using intersecting paths or trajectories, a plurality of plans or strategies including moving a part of the robotic arm or item to a same location, a plurality of plans or strategies selecting a same slot at the conveyance structure in which corresponding items are to be placed, etc. Various other conflicts between plans or strategies are possible.

Although the robotic singulation station schedulers 324, 326, 328, and 330 operate independently to determine plans or strategies for operating corresponding robots to singulate items, in various embodiments, global scheduler 322 provides oversight over the entire robotic system to detect an expected collision event and to implement an active measure to prevent the expected collision event. In some embodiments, implementing the active measure includes sending a fault to a robotic singulation station scheduler (e.g., corresponding to at least one of the robots identified to be associated with the expected collision event). For example, in response to sending the fault to the robotic singulation station scheduler, global scheduler 322 can require the robotic singulation station scheduler to update its current plan or strategy (e.g., in a manner that avoids the expected collision event). The fault sent to the robotic singulation station scheduler can include an indication of the reason for the fault (e.g., an indication of the expected collision event, and/or information pertaining to the expected collision event such as an indication of the manner by which the plan or strategy of the robotic singulation station scheduler conflicts with the plan or strategy of another robotic singulation station scheduler). In some embodiments, in response to global scheduler 322 determining that a path or trajectory for singulation of a first item intersects with a path or trajectory of another item or with a location of an object within the workspace, global scheduler 322 sends a fault to the robotic singulation station scheduler for the robotic structure to singulate the first item and causes such robotic singulation station scheduler to update the path (e.g., the path or trajectory) for singulating the first item in a manner that avoids such a collision.

In various embodiments, the global scheduler 322 employs one or more techniques to optimize the use of a plurality of robots comprising the robotic singulation system to perform singulation, e.g., to maximize overall throughput or to attain a desired overall throughput level. For example, if there are four robots in sequence, the lead (or other upstream) robot may be controlled to place packages in a manner that leaves open slots so that a downstream robot is not waiting for an empty slot. This approach has impacts because downstream robots wait for some unknown/random amount of time because of package flow etc. As a result, a naive strategy (say lead robot places into every empty $4^{th}$ slot) may not optimize collective throughput. Sometimes it might be better for the lead robot to put 2-3 packages into successive slots in sequence if its packages are not flowing, but in various embodiments the system makes such decisions with awareness of state and flow at each station. In some embodiments, the optimal strategy for leaving open slots for downstream robots is based on an anticipated request for an open slot by the downstream robot (as a function of their package flow, for example). In some embodiments, information from the local station scheduler is used to anticipate the maximum throughput of each station and to control conveyor speeds and how many slots are left empty by upstream robots to ensure downstream robots have access to empty slots in proportion to the speed at which they are (currently) able to pick/place. In some embodiments, when the segmented conveyor is full due to some bottlenecks in the downstream sortation process, a robotic singulation system as disclosed herein may pre-singulate one or more packages, for example, inside its corresponding chute or in a nearby staging area, while keeping track of the poses of each pre-singulated package. Once some empty spaces are available from the segmented conveyor, the system/station moves the pre-singulated packages onto the segmented conveyor, singly and in rapid succession, without additional vision processing time.

In some embodiments, the presence of humans working alongside robots has an impact on the placement and multi-robot coordination strategy because the robots or associated computer vision or other sensor system must now also watch what humans do and adapt the robot's placements in real-time. For example, if a human took over a conveyor belt slot that was scheduled to be used by a robot, the system must adjust its global and local schedules/plans accordingly. In another example, if a human disrupts a robot's picked package and causes it to register as not picked the system adapts to correct the error. Or, if a human corrects a robot's errors in picking (robot was commanded to put a package into slot A but accidentally placed the item straddling across slot A and adjacent slot B; and the human places the item into slot B though the system memory says the package is in slot A), the system must observe the human's action and adjust downstream robot actions.

In various embodiments, the global scheduler 322 may cause a station to operate more slowly than its maximum possible throughput at a given time. For example, the global scheduler 322 may explicitly instruct the local station scheduler (e.g., 324, 326, 328, and 330) to slow down and/or may make fewer slots available to the local station, e.g., explicitly by assigning fewer slots to the station or indirectly, such as by allowing upstream stations to fill more slots.

In various embodiments, the global scheduler 322 communicates faults to one or more local station schedulers (e.g., 324, 326, 328, and 330) in response to detecting a state or condition associated with one or more items in the workspace. The fault can be communicated in connection with causing one or more of the local station schedulers to perform an active measure to change or adapt to the detected state or condition (e.g., to change or update a plan for singulation to modify the path or trajectory along which the item is to be singulated). For example, if the global scheduler 322 determines that a robot places two items into a single slot of the conveyor (e.g., based on sensor data pertaining to the conveyor, or in response to receiving an indication from the robotic structure corresponding to the robot), global scheduler 322 sends a fault to one or more local station schedulers downstream from the robot that placed two items into the single slot or downstream from the slot comprising two items. In response to receiving the fault, a local station scheduler can determine a plan or strategy to implement an active measure to pick one of the two items from the slot and to singly place the item in another slot on the conveyor (and to update the distributed data structure with an association between the item(s) and the slot(s)).

In some embodiments, the global scheduler 322 communicates a fault to one or more local station schedulers (e.g., 324, 326, 328, and 330) in response to a determination that an item placed on the conveyor straddles two different slots. The global scheduler 322 communicates the fault to cause the local station scheduler downstream from the item to determine a plan and strategy to reposition the item into a single slot on the conveyor, and to cause a corresponding robot to implement the plan or strategy to reposition the item. The distributed data structure can be correspondingly updated with an association between the item and the slot in which the item occupies after repositioning.

Figure 4A:
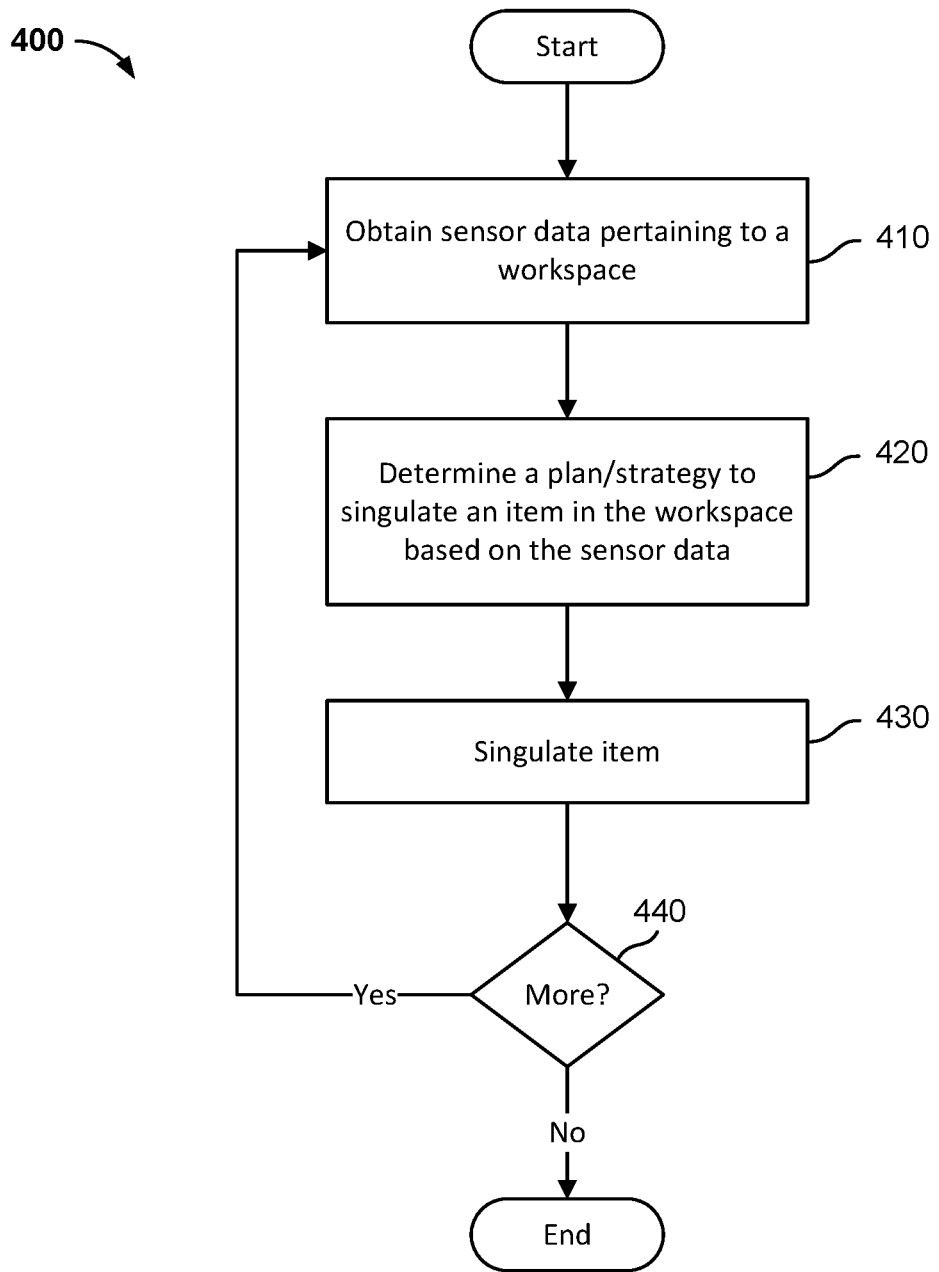
FIG. 4A is a diagram of a process to pick and place items for sorting according to various embodiments.

FIG. 4A is a diagram of a process to pick and place items for sorting according to various embodiments. In some embodiments, process 400 is implemented by a robot system operating to singulate one or more items within a workspace, such as system 200 of FIG. 2A and FIG. 2B. The robot system may include one or more processors that operate to cause a robotic structure (e.g., a robotic arm) to pick and place items for sorting.

At 410, sensor data pertaining to a workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace may be determined based at least in part on the sensor data. The sensor data can be used in connection with determining at least one characteristic (e.g., attribute) of one or more items within the workspace such as items in the source pile/flow of the chute, or an item grasped by the robotic arm, and the item already positioned in a slot/tray on the conveyor, etc. In some embodiments, the sensor data is used in connection with determining one or more characteristics of the conveyance structure such as determining the slots on the conveyor that are empty or unreserved, determining a speed of the conveyor, and/or determining the characteristics of at least one slot or of at least one item already on the conveyor.

At 420, a plan or strategy to singulate an item in the workspace is determined based at least in part on the sensor data. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot by robot basis such that if the robotic system includes a plurality of robots, each robot operates independent of the other robot(s).

According to various embodiments, the plan or strategy to singulate the one or more items in the workspace is determined based at least in part on the sensor data, such as sensor data including data associated with an item present in a workspace (e.g., the item to be singulated and/or an item already located on the conveyor) or another object included in the workspace. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics (or attributes) pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), a height of the item, a length of the item, an estimated weight of the item, and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyance structure at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

In some embodiments, the determination of the plan to singulate an item includes a determination of a manner by which the applicable robotic arm is to grasp the item. The plan to singulate the item can indicate a particular end effector to be used to pick up the item from the source pile, and one or more settings associated with the end effector in connection with grasping the item such as a grasp strength, a pressure to apply on a suction-based end effector, etc. The plan to singulate the item can indicate an orientation of one or more of the robotic arm, a wrist on the robotic arm, and the end effector. In some embodiments, the end effector is positioned to be orthogonal to the item when grasping the item. To so position the end effector in relation to the item, the robotic structure can control to operate the orientation of one or more of the robotic arm, a wrist on the robotic arm, and the end effector.

At 430, the item is singulated. In some embodiments, the item is singulated in response to the plan or strategy for singulating the item being determined. For example, a robotic arm is operated to pick one or more items from the workspace and place each item singly in a corresponding location in a singulation conveyance structure. The singulation of the item comprises picking the item from the workspace (e.g., from the source pile/flow) and singly placing the item on the conveyance structure. The robotic system singulates the item based at least in part on the plan or strategy for singulating the item. For example, the robotic system singulates the item along a path or trajectory according to the plan or strategy to singulate the item.

At 440, a determination is made as to whether further items are to be singulated. If there are more items, a further iteration of steps 410, 420, and 430 is performed, and successive iterations are performed until it is determined at 440 that there are no more items in the chute (or other receptacle or source) to be picked and placed.

Figure 4B:
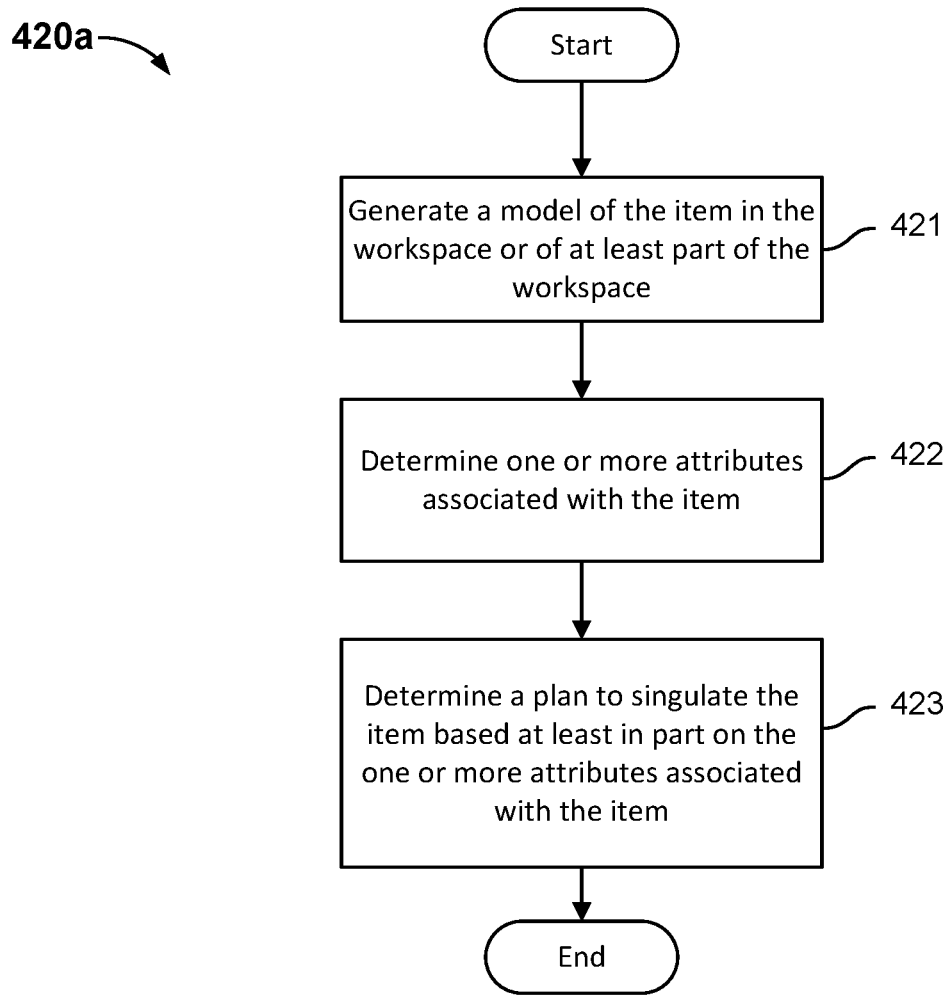
FIG. 4B is a diagram of a process to determine a plan to pick and place items for sorting according to various embodiments.

FIG. 4B is a diagram of a process to determine a plan to pick and place items for sorting according to various embodiments. In various embodiments, process 420a of FIG. 4B implements step 420 of the process 400 of FIG. 4A.

At 421, a model of the item in the workspace or of at least part of the workspace is generated. In some embodiments, the robotic system generates the model of the item within the workspace. The model of the item within the workspace can be part of a larger model of the workspace, including the one or more items within the workspace. The robotic system generates the model using the sensor data that is determined based at least in part on information obtained from one or more sensors (e.g., the vision system, sensor arrays, weight sensors, pressure sensors, etc.). The model can be indicative of one or more characteristics of various elements of the workspace such as the source pile/flow of items on the chute, a speed of the conveyor, a mapping of empty and occupied slots or trays on the conveyor, attributes of items on the conveyor, attributes within the source pile/flow, etc.

At 422, one or more attributes associated with the item are determined. In some embodiments, the one or more attributes associated with the item are determined based at least in part on the model of the item in the workspace. As an example, the robotic system determines an attribute of an item to be singulated based on identifying the item to be singulated, and obtaining information in the model pertaining to the item. The one or more attributes that are determined based on the model can be attributes that are to be used in connection with determining or updating a plan for singulating the item. In some cases, the robotic system obtains attributes of a first item within the workspace in connection with determining a plan for singulating a second item (e.g., to assess whether or how the first item within the workspace would impact singulation of the second item).

At 423, a plan to singulate the item is determined. In some embodiments, the plan to singulate the item is determined based at least in part on the one or more attributes associated with the item. The plan can include one or more instructions used to operate a robotic structure to pick the item from the source pile/flow and singly place the item on the conveyor, or information from which the robotic structure can derive such instructions for singulating the item. According to various embodiments, the plan includes (or defines) a path or trajectory along which the item is to be moved during singulation.

As an example, in the case of the one or more attributes including the weight of the item, determining the plan to singulate the item may include determining whether the robotic arm can lift the item, and if so, determining the grasp strength required to pick the item from the source pile/flow. The robotic structure can determine the amount of pressure to attain between suction-based end effectors and the item. In response to determining that the robotic arm cannot lift the item, the determining the plan to singulate the item can include determining a path to partially lift and drag (or push) the item from the source pile/flow to a corresponding location on the conveyor.

As another example, in the case of the one or more attributes including a location of a label on the item, determining the plan to singulate the item may include determining a manner of singulating the item that optimizes the likelihood that the label will be read by a sensor within the workspace. Based on the location of one or more sensors within the workspace, the robotic system can determine a side of the item that includes the label, determine a side by which to grasp the item, and a path/trajectory along which the item is to be singulated to expose the label on the item to the one or more sensors (e.g., the vision system or other sensor array such as a barcode reader).

As another example, in the case of the one or more attributes including a size or dimension of the item, determining the plan to singulate the item may include determining a manner by which to pick up the item, and a location on the conveyor on which the item is to be placed such as in a manner to optimize the likelihood that one or more labels or identifiers will be exposed to one or more sensors of the workspace. The robotic system can determine whether a slot/tray on the conveyor is occupied by a relatively large item, and determine that the slot/tray in which the item to be singulated is a slot/tray that is not adjacent to the relatively large item, or that such slot/tray is a predefined distance or spacing from the relatively large item. In some embodiments, in response to detecting a relatively large item on the conveyor, the robotic system can select to place an item a predefined minimum distance or spacing from the relatively large item. In some embodiments, in response to detecting a relatively large item on the conveyor, the robotic system can determine a distance/spacing that is sufficient in order to ensure that the relatively large item does not block the one or more sensors from capturing information on the item to be singulated. According to various embodiments, the determining the location in a manner to optimize the likelihood that one or more labels or identifiers will be exposed to one or more sensors includes determining a set of locations in which the item may be placed and corresponding probabilities that a label or identifier on the item would be scanned if the item were singulated to that location and selecting a location that has a highest corresponding probability. In some embodiments, a location having a corresponding probability that exceeds a threshold probability, or that is within a predefined percent or number of the set of locations having the highest corresponding probabilities is determined. In some embodiments, a location and corresponding probability that the label or identifier on the item would be scanned if the item were singulated to that location are determined, and the probability is compared to a predefined threshold for a minimum desired probability. In response to determining that the probability corresponding to a particular location does not exceed the predefined threshold for a minimum desired probability, a new location and corresponding probability are determined. The robotic system can continue to iterate determining the location and corresponding probability until the robotic system determines that the corresponding probability exceeds the predefined threshold for a minimum desired probability.

Although various embodiments have been described in connection with determining the plan to singulate an item based on at least one attribute for the item to be singulated, various embodiments include determining the plan to singulate the item based on an attribute of another item or object within the workspace. As an example, the plan to singulate the item may be determined based at least in part on an attribute of another item located on the chute and/or an attribute of another item within a slot on the conveyor.

Figure 4C:
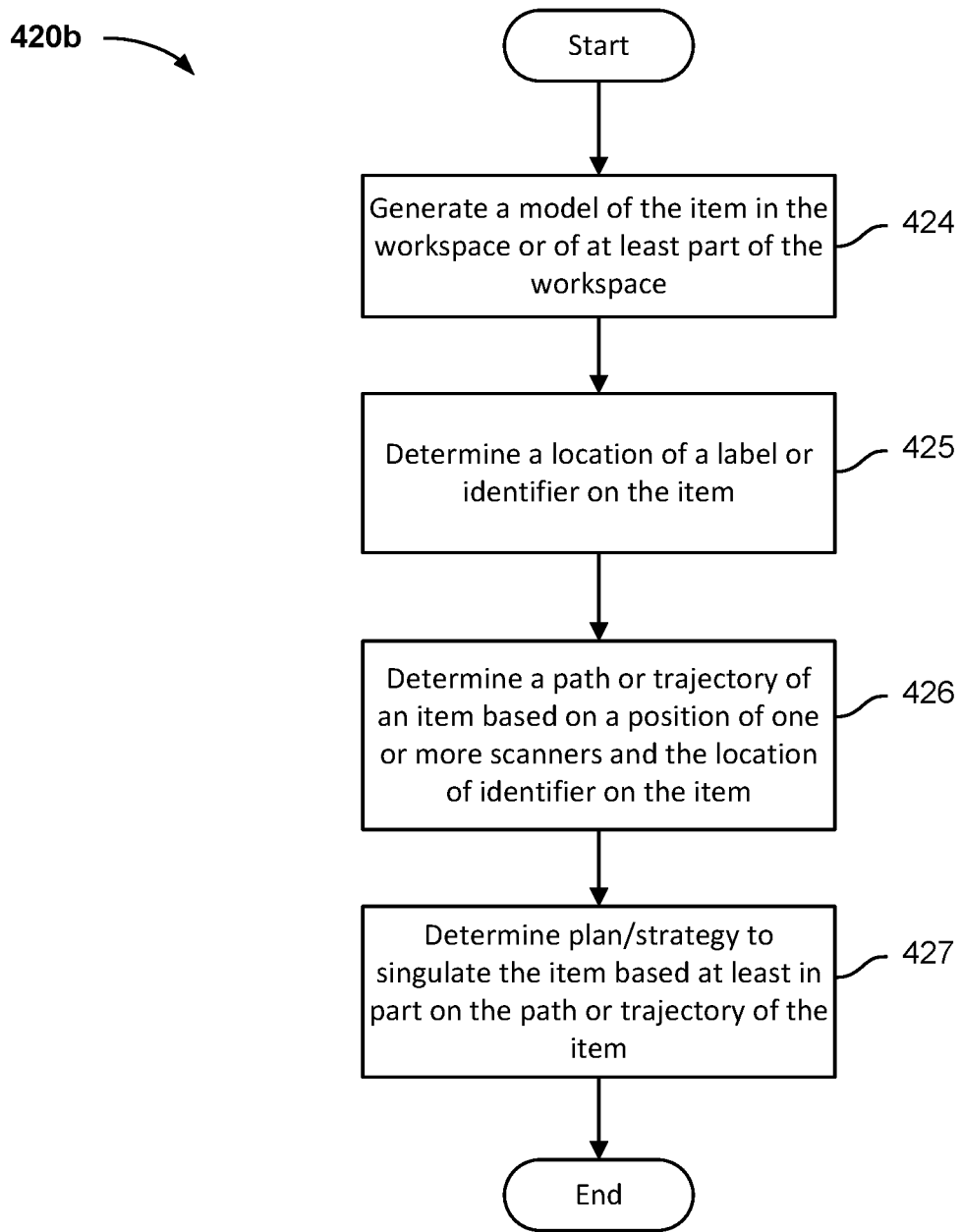
FIG. 4C is a diagram of a process to determine a plan to pick and place items for sorting according to various embodiments.

FIG. 4C is a diagram of a process to determine a plan to pick and place items for sorting according to various embodiments. In various embodiments, process 420b of FIG. 4C implements step 420 of the process 400 of FIG. 4A.

At 424, a model of the item in the workspace or of at least part of the workspace is generated. In some embodiments, the robotic system generates the model of the item within the workspace. The model of the item within the workspace can be part of a larger model of the workspace, including the one or more items within the workspace. The robotic system generates the model using the sensor data that is determined based at least in part on information obtained from one or more sensors (e.g., the vision system, sensor arrays, weight sensors, pressure sensors, etc.). The model can be indicative of one or more characteristics of various elements of the workspace such as the source pile/flow of items on the chute, a speed of the conveyor, a mapping of empty and occupied slots or trays on the conveyor, attributes of items on the conveyor, attributes within the source pile/flow, etc.

At 425, a location of a label or identifier on the item is determined. In some embodiments, the robotic system determines a location of the label or identifier on the item using the model of the item in the workspace or of the workspace. For example, sensor data based on information obtained from the vision system is analyzed to determine whether the item comprises an identifier or label on a visible side.

In some embodiments, in response to determining that the label or identifier is not visible on the surfaces of the item, the robotic system can deem a non-visible surface (e.g., the bottom surface) to include the item and identifier. In some implementations, in response to determining that a label or identifier is not visible on the item, the robotic system can determine a mapping of probabilities to locations on the item at which the label may be located. For example, if one surface of the item is completely non-visible and another surface of the item is partially occulated by another item on the workspace, the robotic system can determine respective likelihoods that the item or label is located on a particular surface or in a particular area. According to various embodiments, the robotic system determines the location or the label or identifier based on the mapping of probabilities to locations on the item.

In some implementations, several similar items are singulated from the source pile/flow. The robotic system can build a model of an item based on markings (e.g., branding logos, labels, identifiers) on the item. For example, the robotic system may build a model that indicates for a particular item a certain logo is on a front of the package, and a label is on the reverse side. Accordingly, if label or identifier is not visible based on current information from the vision system, etc. but the logo is visible, the robotic system can determine the location of the label or identifier based on the determination of a location of the logo. The robotic system can use the model of the item or set of items to determine the location of the identifier or label based at least in part on determining the location of the logo, etc. As such, various embodiments use a model of an item that is based on historical information pertaining to similar items.

At 426, a path or trajectory of an item is determined based on a position of one or more scanners and the location of the identifier/label on the item. In some embodiments, the path or trajectory is determined to achieve a desired probability that the identifier/label on the item is successfully scanned. As an example, the path or trajectory may be determined to optimize the likelihood that the identifier/label is scanned. In some embodiments, the path or trajectory is determined to achieve a desired probability that the item is successfully singulated.

In some implementations, the determining the path or trajectory includes determining a set of possible paths or trajectories of the item and determining corresponding probabilities that the particular path/trajectory would result in a successful scan. The robotic system may then select the path or trajectory along which the item is to be singulated from among the set of possible paths or trajectories. According to various embodiments, the robotic system selects the path or trajectory corresponding to a highest likelihood that the identifier/label is successfully scanned. The robotic system can select the path or trajectory along which the item is to be singulated based at least in part on a relative probability that the identifier/label is expected to be successfully scanned (e.g., relative to the probabilities of other paths/trajectories in the set), and one or more of an amount of time to singulate the item according to a particular path/trajectory, an expected collision with another item/object along the path/trajectory, a probability that the item will be successfully singulated if moved along the particular path/trajectory, etc. According to various embodiments, the robotic system selects the path or trajectory according to a determination that the probability of successful scanning of the identifier/label is greater than a predefined threshold value.

At 427, a plan or strategy to singulate the item is determined based at least in part on the path or trajectory of the item. The plan or strategy can include one or more instructions used to operate a robotic structure to pick the item from the source pile/flow, to move the item from the source pile/flow to a selected location of the conveyor, and singly place the item on the conveyor. In some cases, the plan or strategy includes information from which the robotic structure can derive such instructions for singulating the item.

In some embodiments, the plan includes a strategy for grasping the item. For example, the strategy for grasping the item can include an indication of a side from which the item is to be grasped. The robotic system can use the model to determine a location of an identifier/label on the item and determine the side from which the item is to be grasped based at least in part on the location of the identifier/label. The manner by which the item is grasped can be selected to ensure that the identifier/label is exposed to the one or more sensors for scanning the identifier/label. The strategy for grasping the item on a particular side can include repositioning/reconfiguring the item to allow for the end effector to engage the item on the particular side. For example, the strategy for grasping the item can include pulling the item from the source pile/flow or knocking the item over onto a different side, etc. to provide better access to the desired surface. As another example, the strategy for grasping the item can include a grasping strength (e.g., a pressure to be applied by the end effector). The grasping strength can be determined based at least in part on a weight of the item, a determination that the item is partially occulted and the picking of the item will experience resistance from other items, a determination that the item may oscillate or sway during singulation, etc. As another example, the strategy for grasping the item can include an indication of a type of end effector or a particular end effector(s) among a plurality of end effectors, etc. to be used to singulate the item. The type of end effector may be selected based on a type of packaging of the item (e.g., to avoid slippage, tenting, etc.), a weight of the item, a location of the identifier/label on the item, etc.

In some embodiments, the plan includes a strategy for moving the item. As an example, the strategy for moving the item can include an indication of a speed at which the item is moved during singulation. In some cases, the speed can be impacted based on the path/trajectory of the item in relation to the location or path/trajectory of other items or objects in the workspace or on the conveyor, a speed at which the conveyor is moving, a slot/tray in which the item is to be singulated, the strategy for releasing the item (e.g., whether the item is to be "tossed" such as along a determined ballistic trajectory), etc. As another example, the strategy for moving the item can include an indication of one or more mechanisms to dampen oscillation (or swaying of the item) during singulation. The indications of the one or more mechanisms can include increasing the grasping strength, decreasing the speed of singulation, etc.

In some embodiments, the plan includes a strategy for releasing the item. For example, the plan can have a strategy to release all end effectors at the same time. As another example, the plan can have a strategy for staggering release of at least two different end effectors. In the case of suction-based end effectors, a staggered release of the end effectors can improve the speed by which the item is released because after a first end effector is released, the air flow can be reversed for that end effector and air can be dispersed therefrom. The reversed airflow serves to push the item from the other end effector(s) as such other end effector(s) are released (e.g., as pressure is ceased in the remaining end effector). In contrast, if the suction is removed at the same time across the end effectors, gravity acts on the item and release of the item is not immediate as the pressure takes a certain amount of (non-negligible) time to normalize. Accordingly, the staggered release of the end effectors can be a more efficient method for releasing an item (to the applicable location on the conveyor). In some embodiments, the strategy for releasing the item includes releasing all the end effectors at the same time and promptly reversing air flow in the suction-based system to emit air from the end effectors to push the item away from the end effector.

In some embodiments, the strategy for releasing the item includes moving the arm to a location from which the item is to be dropped, and thereafter releasing the end effectors (so that the item drops straight down to the selected location on the conveyor). In some embodiments, the strategy for releasing the item includes releasing the end effectors in a manner that serves to "toss" the item to the selected location on the conveyor. For example, the robotic system in various embodiments determines a ballistic trajectory based on a determination of a timing of releasing the end effectors while the robotic arm is moving so that a trajectory of the item will lead to the selected location on the conveyor (at the determined time so as to land within the applicable slot/tray on the moving conveyor). The strategy for releasing the item and/or the plan for the singulating the item using a ballistic trajectory may be determined based at least in part on a size of the item, such as a height of the item.

Figure 5A:
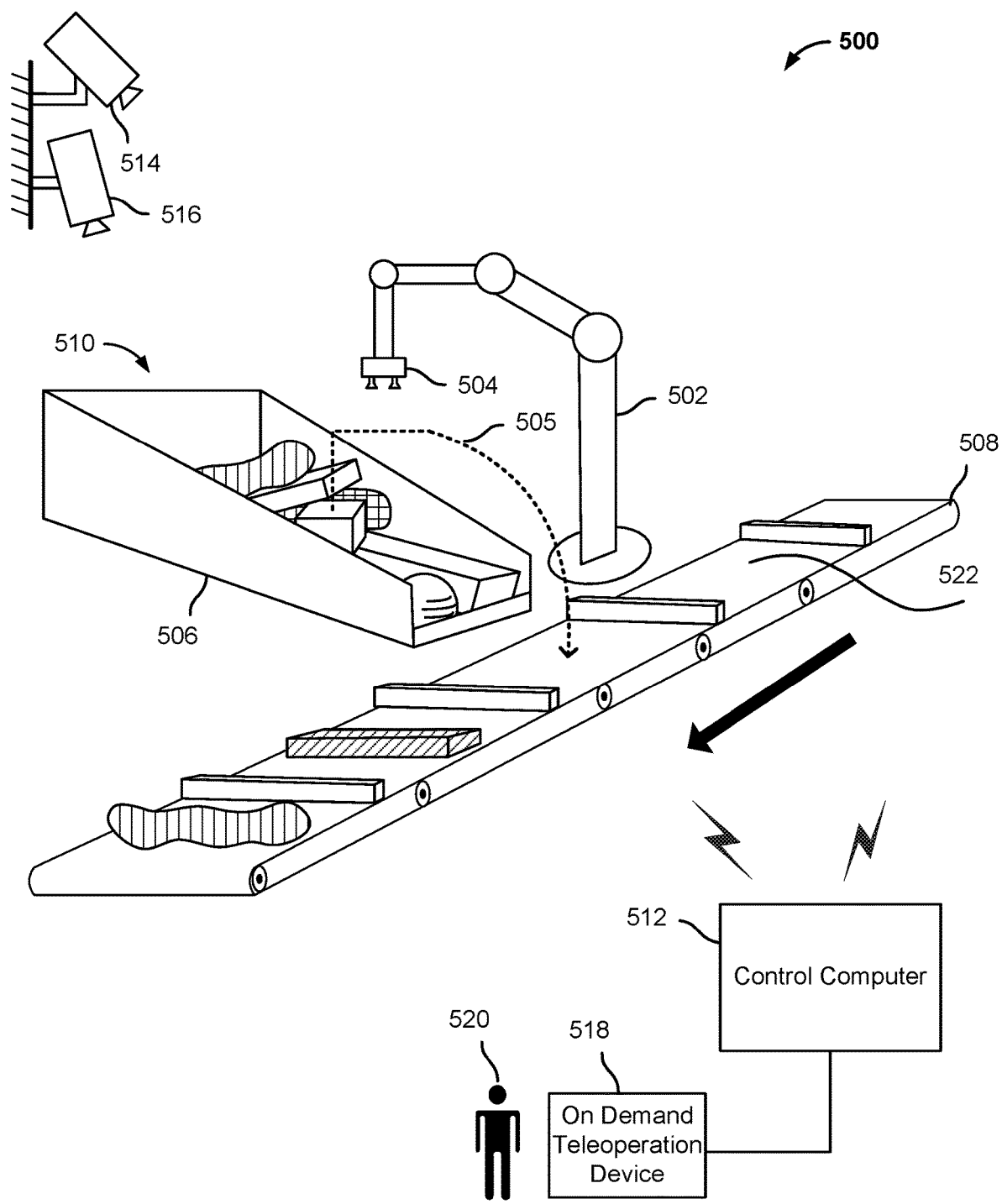
FIG. 5A is a diagram illustrating a robotic singulation system according to various embodiments.

FIG. 5A is a diagram illustrating a robotic singulation system according to various embodiments. In various embodiments, system 500 of FIG. 5A implements the hierarchical scheduling system 300 of FIG. 3, process 400 of FIG. 4A, process 420a of FIG. 4B, process 420b of FIG. 4C, process 600 of FIG. 6, process 850 of FIG. 8B, and process 875 of FIG. 8C.

In the example illustrated in FIG. 5A, system 500 includes a robotic arm 502 equipped with end effector 504. While in the example shown the end effector 504 is a suction-based end effector, in various embodiments, one or more other types of end effectors may be used in a singulation system as disclosed herein, including without limitation a pinch-based end effector or other types of actuated grippers. Robotic arm 502 and end effector 504 are configured to be used to retrieve parcels or other items that arrive via chute or bin 506 and place each item in a corresponding location on segmented conveyor 508. In this example, items are fed into chute 506 from an intake end 510. For example, one or more human and/or robotic workers may feed items into intake end 510 of chute 506, either directly or via a conveyor or other electro-mechanical structure configured to feed items into chute 506.

In the example shown, one or more of robotic arm 502, end effector 504, and conveyor 508 are operated in coordination by control computer 512. In some implementations, control computer 512 is configured to control a plurality of robotic arms operating at one or more workstations. Robotic system 500 can include one or more sensors from which an environment of the workspace is modeled. In the example shown in FIG. 5A, system 500 includes image sensors, including in this example 3D cameras 514 and 516. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 512 includes a workspace environment state system such as a vision system used to discern individual items, debris on the workspace, and each item's orientation based on sensor data such as image data provided by image sensors, including in this example 3D cameras 514 and 516.

According to various embodiments, in connection with singulating an item, system 500 determines a path/trajectory 505 for singulating the item. As illustrated in FIG. 5A, path/trajectory 505 starts from a location from which the item is to be picked, the path/trajectory along which the item is moved to conveyor 508, and a location and time at which the item is to be released to coincide in space and time with a slot, tray, or other destination selected as the location at which the item is to be placed on the destination conveyance structure, i.e., slot/tray 522 of conveyor 508 in this example. In some embodiments, system 500 determines a slot/tray 522 to which the item is to be singulated. Accordingly, the path/trajectory 505 is determined taking into account a location of the slot/tray 522 and the movement of conveyor 508. For example, system 500 determines the path/trajectory 505 to attain an intersection between the item to be singulated and the selected slot/tray 522 at a particular time. In various embodiments, system 500 reserves the slot/tray 522 to ensure that slot/tray 522 is unoccupied at the time the item is to be placed therein. For example, system 500 updates the distributed data structure to indicate that slot/tray 522 is occupied (or will be occupied). In various embodiments, the trajectory 505 includes a final, pre-release phase or stage in which the robotic arm 502 is operated to track and match a speed and direction of motion of conveyor 508, to maintain the item in position over the destination 522 until the item is released.

Referring further to FIG. 5A, in the example shown, system 500 further includes an on-demand teleoperation device 518 usable by a human worker 520 to operate one or more of robotic arm 502, end effector 504, and conveyor 508 by teleoperation. In some embodiments, control computer 512 is configured to attempt to grasp and place items in a fully automated mode. However, if after attempting to operate in fully automated mode control computer 512 determines it has no (further) strategies available to grasp one or more items, in various embodiments, control computer 512 sends an alert to obtain assistance from a human operator via teleoperation, e.g., by human operator 520 using teleoperation device 518. In various embodiments, control computer 512 uses image data from cameras such as cameras 514 and 516 to provide a visual display of the scene to human worker 520 to facilitate teleoperation.

Figure 5B:
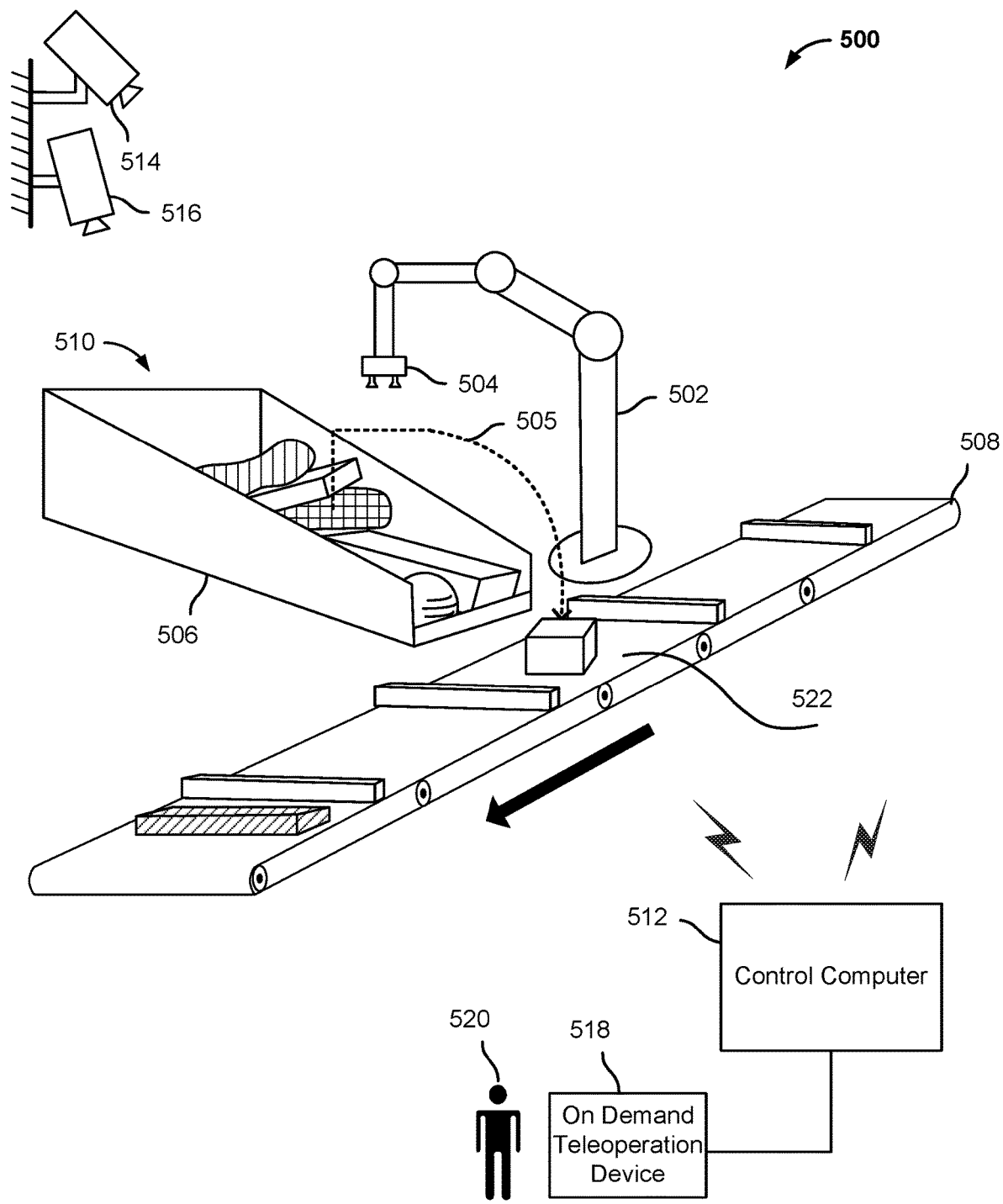
FIG. 5B is a diagram illustrating a robotic singulation system according to various embodiments.

FIG. 5B is a diagram illustrating a robotic singulation system according to various embodiments. In the example shown, the robotic singulation system of FIG. 5A has been advanced to a subsequent point in time to illustrate that the item has been picked from chute 506 and placed on slot/tray 522 of conveyor 508 according to the path/trajectory 505. System 500 models the workspace to include information pertaining to the items within chute 506 (including the item to be singulated) and information pertaining to conveyor 508. Accordingly, system 500 may determine the plan to singulate the item to a selected slot/tray 522 on conveyor 508.

Figure 6:
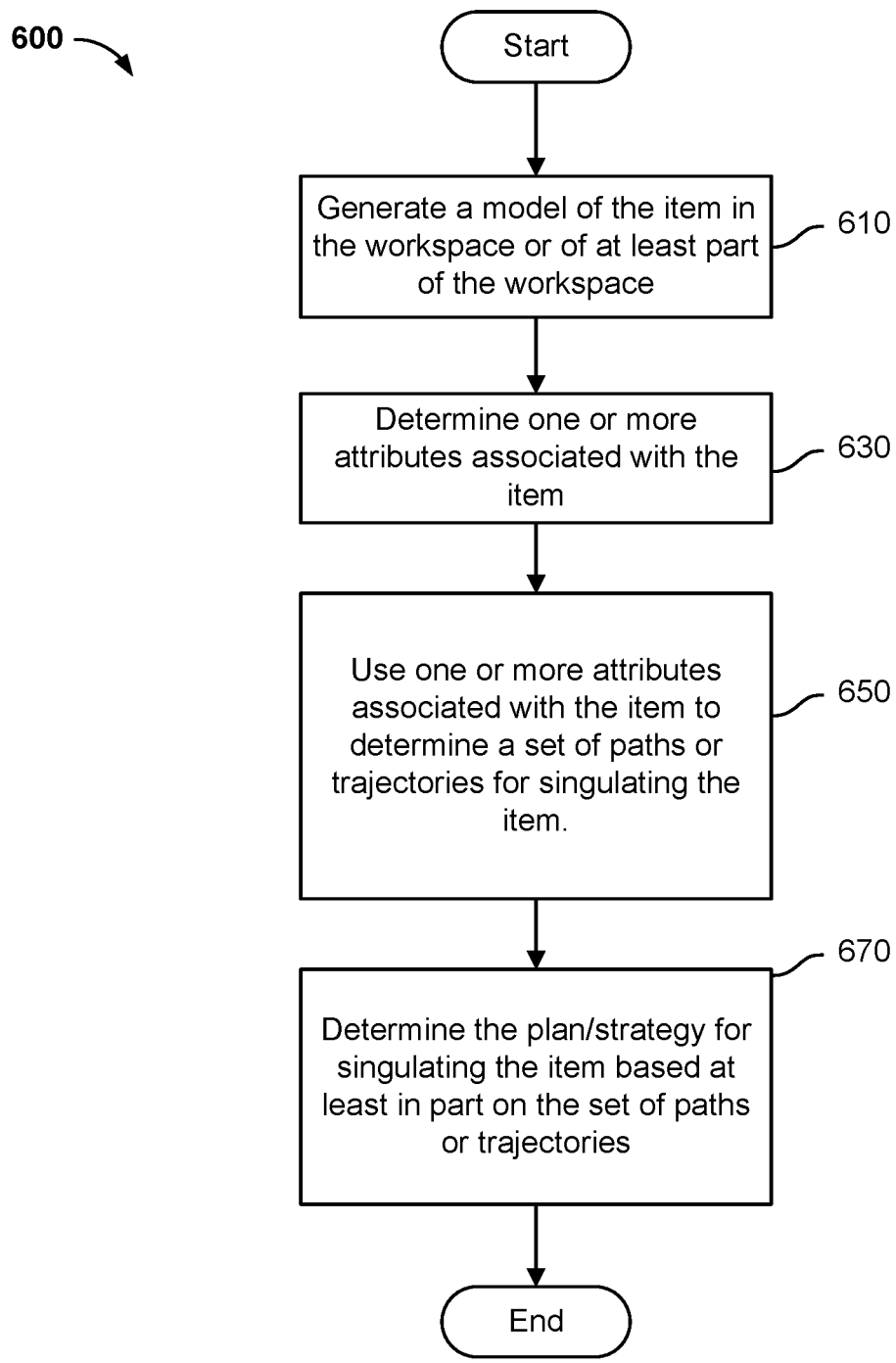
FIG. 6 is a diagram of a process to determine a plan or strategy to singulate one or more items using an attribute of an item within a workspace according to various embodiments.

FIG. 6 is a diagram of a process to determine a plan or strategy to singulate one or more items using an attribute of an item within a workspace according to various embodiments. Process 600 of FIG. 6 can be performed by system 200 of FIGS. 2A and 2B and/or system 500 of FIGS. 5A and 5B. In some embodiments, process 600 is implemented by a robot system operating to singulate one or more items within a workspace. The robot system includes one or more processors that operate to cause a robotic structure (e.g., a robotic arm) to pick and place items for sorting.

At 610, a model of the item in a workspace or of at least part of a workspace is generated. The mode of the item or the workspace may be generated in a similar manner to the model of 421 in process 420a of FIG. 4B, and/or the model of 424 in process 420b of FIG. 4C. In some embodiments, a global model of the workspace includes various models for different parts of the workspace, such as a model of the item in the workspace, a model of a conveyor, a model of other robotic arms within the workspace, etc.

At 630, one or more attributes associated with the item are determined. The one or more attributes associated with the item may be determined in a similar manner to the one or more attributes of 422 in process 420a of FIG. 4B, and/or the location of the label or identifier of 425 in process 420b of FIG. 4C.

At 650, the one or more attributes associated with the item are used in connection with determining a set of paths or trajectories for singulating the item. According to various embodiments, at least one of the set of paths or trajectories is determined in a similar manner to the path or trajectory of 426 of process 420b of FIG. 4C.

The path or trajectory along which an item is to be singulated is determined based at least in part on sensor data according to various embodiments. The robotic system may obtain a plurality of sensors that output information pertaining to the workspace, including the items or objects within the workspace. The sensor data is obtained based on the information output from one or more sensors and used in connection with determining a path or trajectory. In some embodiments, the path or trajectory is determined based at least in part on one or more attributes of the item to be singulated. Examples of attributes of the item include a weight, a size (e.g., one or more dimensions), a type of packaging, an identifier on the item, a location of an identifier or label on the item, a location of the item relative to the chute and/or conveyor, information obtained from the identifier or label on the item, etc. Various other attributes can be used in connection with determining the path or trajectory. Determination of the path or trajectory of the item may be further based at least in part on a location on the conveyor at which the item is to be placed, an attribute of an item(s) already on the conveyor, an attribute of an item within the workspace (e.g., an item within the source pile/flow), a grip strength with which the robotic arm has grasped the item, a speed with which the robotic arm is to move the item, etc.

According to various embodiments, a set of paths or trajectories for singulating an item is determined, and the path or trajectory along which the item is to be singulated is selected from the set of paths or trajectories. The path or trajectory may be selected based on various properties associated with the corresponding paths or trajectories within the set. Examples of the properties associated with the corresponding paths or trajectories that may be used in connection with selecting the path or trajectory include a speed with which the item is to be singulated, a location on the conveyor in which the item is to be singulated, a probability of success that the item is to be singulated according to the particular path or trajectory, an indication of whether another item or object within the workspace intersects with the particular path or trajectory, etc. In some embodiments, the probability of success that the item is to be singulated according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability or exceeds a threshold number or percentage of other paths or trajectories within the subset.

At 670, the plan or strategy for singulating the item is determined based at least in part on the set of paths or trajectories. According to various embodiments, at least one of the set of paths or trajectories is determined in a similar manner to the plan of 423 of process 420a of FIG. 4B, and the plan of 427 of process 420b of FIG. 4C. The plan or strategy for singulating the item may be determined based at least in part on the path/trajectory selected from the set of paths or trajectories for singulating the item.

In various embodiments, techniques that depend solely on cameras and other sensors mounted in a workspace in which robotic singulation is performed may encounter technical challenges in identifying and determining a plan and strategy to grasp items and place them singly in a segmented conveyor or other destination. For example, a label or other identifying information that the robotic singulation system may be configured to use to identify an item and its attributes may be obscured by other objects. Another challenge is the full dimensions and extent of an item may be obscured by other items piled on or near the item. If an item is only partially in view of cameras or other sensors, the system may not be able to accurately determine the extent and estimated weight of the item, it's center of gravity, etc. In addition, the system may not be able to detect the boundary between items with similar packaging, color, texture, and markings that are right next to each other and may instead mistake them to be a single item. Finally, using stationary cameras and/or other sensors alone it may not be possible to detect a damaged item and/or when two items have been grasped accidentally using a robotic end effector and/or when a second item is stuck to an item that has been grasped.

In various embodiments, techniques disclosed herein are used to overcome one or more of the above technical challenges. In various embodiments, each item comprising at least a subset of items in a pile and/or flow of items, such as in a singulation feed chute like chute 206 of FIG. 2A, has an RFID or similar tag that identifies the item and/or its attributes. In some embodiments, the RFID or similar tag (sometimes referred to herein "ID tag") comprises a passive RFID tag. A tag reader mounted on and/or integrated into a robotic end effector mounted on an operable end of a robotic arm, for example, is moved under robotic control to a position of relatively close proximity to an item, enabling the tag to be read. For example, segmented image data generated by 3D or other cameras in the space may be used to determine at a first order the boundaries between items in a source of items, such as chute 206. To confirm the item boundaries and the identification and attributes of an item, the robotic arm is used to position the end effector within a read range of the ID tag. The reader mounted on and/or integrated into the end effector is used to read the ID tag. Data read from the tag may include or be used to look up one or more attributes of the item, such as its dimensions, weight, rigidity, fragility, etc. The attributes are used, in various embodiments, to determine and execute a strategy to grasp and move the item to a singulation destination, such as a specific location on a segmented conveyor or other receptacle, conveyance, etc.

In various embodiments, a robotic singulation system as disclosed herein employ trajectory (path) planning and robot control algorithms that use information such as object weight, dimensions, center of gravity, packaging type and material, and other object attributes to optimize and/or update one or more of the grasping strategy, trajectory, and placement of the object. For example, a lighter object may be able to be moved through a trajectory safely at a higher speed than a heavier object. Weighing an object and estimating its center of gravity after it has been grasped, e.g., using force sensors in the wrist (coupling the end effector to the robotic arm) or another structure, requires additional time. Other package properties, such as dimensions, material, center of mass, damaged condition, etc., may be fully or partially obscured by other objects in which an object is piled, for example. In various embodiments, the foregoing technical challenges are overcome at least in part by using an end effector mounted/integrate sensor, in some embodiments in connection with other sensors, to read object information (e.g., an object identifier, tracking information entered by an upstream system or user, destination address information, other routing information, etc.) prior to grasping an object. In some embodiments, an object identifier is read via a sensor configured to use near field sensing and/or tag reading technologies. The object identifier is used to look up object attributes in a database. In some embodiments, one of the grasp, path (trajectory), and placement of the object may be determined and/or updated based at least in part on such object attributes (properties).

In some embodiments, an end effector based camera or other sensor may be positioned optimally to read an address label or other information printed, affixed, or otherwise displayed on the surface of the object, regardless of the angle at which the object is positioned in the pile. If the label or information is obscured, the robotic arm and end effector may be used to reposition the object, or adjacent objects, to expose the surface to be read, such as an address label, and then the end effector put into a position and orientation to facilitate reading the label, e.g., using a camera mounted on or otherwise integrated with the end effector.

In some embodiments, a robotic system comprising an end effector-based sensor, as disclosed herein, may be used to read the ID tags of objects buried deep within a pile, including objects not yet visible to the computer vision system. ID tags of objects that are not yet visible or accessible may be used, in various embodiments, to plan future grasp, movement, and placement of such objects, e.g., once objects on the top of the pile have been moved.

Figure 7A:
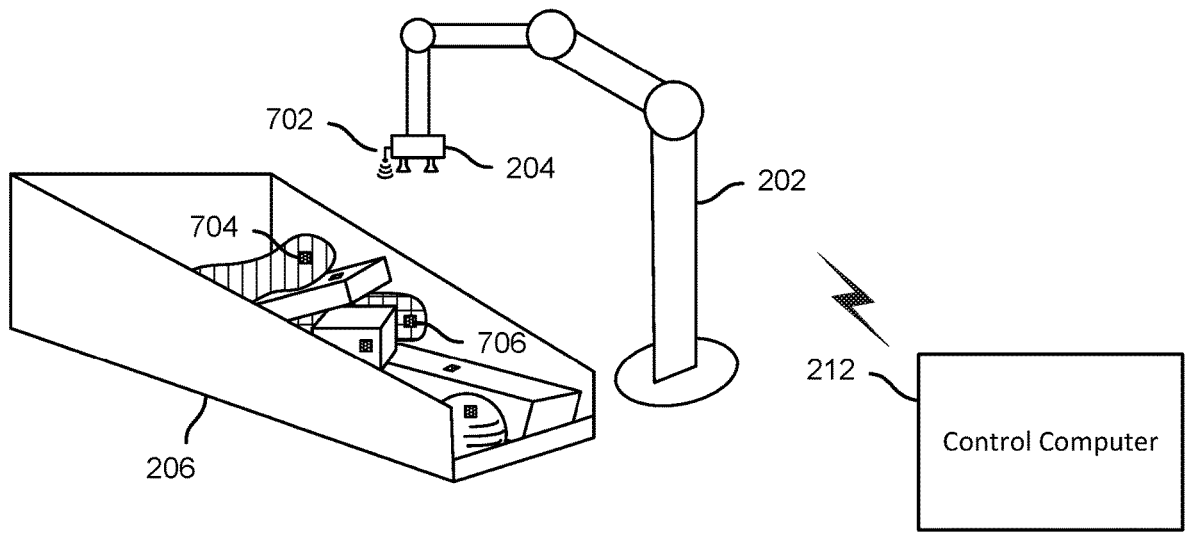
FIG. 7A is a diagram illustrating an embodiment of a robotic singulation system having an end effector-based sensor.

FIG. 7A is a diagram illustrating an embodiment of a robotic singulation system having an end effector-based sensor. In the example shown, end effector 204 of robotic arm 202 of FIG. 2A includes (or has mounted thereon) a relatively short-range RF tag reader 702. Under robotic control, robotic arm 202 is manipulated to position the end effector 204 and RF tag reader 702 to within a read range of an item the ID tag of which is desired to be read. As shown, each of a plurality of items in chute 206 has an ID tag, e.g., ID tag 704, 706, which can be read when the RF tag reader 702 is brought within a read range. In various embodiments, the read range may depend on one or more of the ID tag used, the size and attributes of the antenna and/or other components comprising the RF tag reader 702, the power applied to the RF tag reader 702 in the read operation, etc. In some embodiments, the read range is similar to proximity card read ranges, e.g., 2.5 to 3.9 inches. In various embodiments, near-field communications (NFC) technologies, tags, readers, and protocols may be used, such as communications according to the ISO 14443 air-interface protocol standard.

Figure 7B:
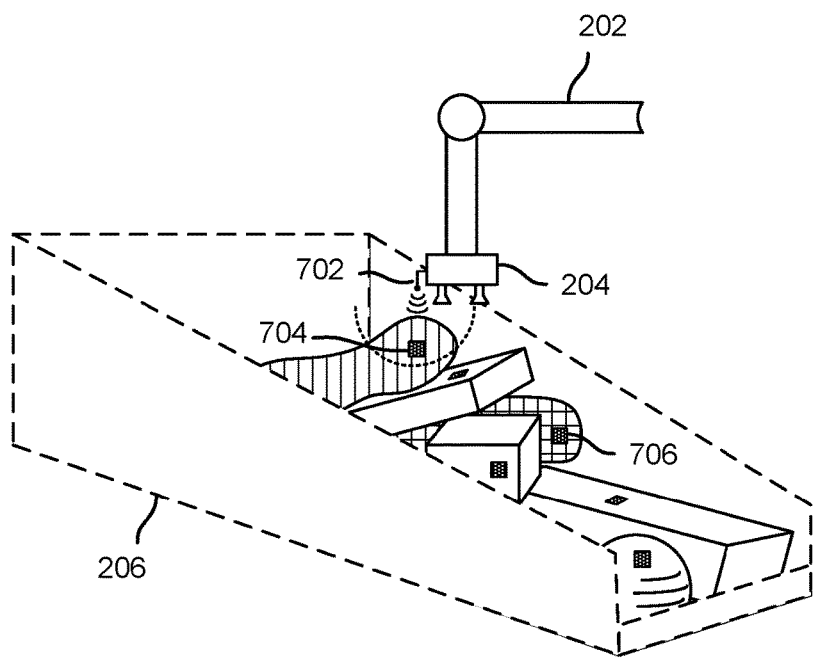
FIG. 7B is a diagram illustrating an embodiment of a robotic singulation system having an end effector-based sensor.

FIG. 7B is a diagram illustrating an embodiment of a robotic singulation system having an end effector-based sensor. In the example shown, the end effector 204 and RF tag reader 702 have been moved within a read range of ID tag 704, as indicated by the dashed semicircle centered on the RF tag reader 702 as shown. In the position shown, only the ID tag 704 is read. Other ID tags associated with other items in chute 206, such as ID tag 706, are not within the read range of RF tag reader 702, and as a result only ID tag 704 would be read in the position shown.

In various embodiments, a robotic singulation system as disclosed herein may use cameras in a workspace, such as cameras 214 and 216 of FIG. 2A, to determine a first order segmentation of a three-dimensional view of the workspace. The system would use the RF tag reader 702, as shown in FIGS. 7A and 7B, to verify the first order view and/or obtain further information about individual items in the workspace. For example, an item identifier read from ID tag 704, in the example shown, is used in various embodiments to look up one or more of an item type and/or one or more attributes of items of that type and/or of that specific item, such as the item dimensions, weight, packaging type, rigidity, etc., and/or other attributes relevant to selection and implementation of a strategy to grasp and move the item using end effector 204 and robotic arm 202.

In some embodiments, information associated with the item destination may be looked up, such as a destinate city, state, country, and/or specific street address to which the item is to be delivered. The destination information may be associated with the item and/or a location in which the item is placed, such as a specifically identified bin or segment on a segmented or other conveyor, such as segmented conveyor 208 of FIG. 2A. Downstream elements may be configured to use the destination information to divert or otherwise direct the item to or along a path associated with the destination, such as a bin or other receptacle used to stage or load items for further shipment and/or delivery to the destination.

In various embodiments, information read from an ID tag, such as ID tag 704 in the example shown in FIGS. 7A and 7B, may be used to verify information as read from an address label, QR or other optical code, etc. (or vice versa). If the information is not complete or does not match, exception handling may be performed, such as setting the item aside for a human worker to resolve any issues.

In various embodiments, techniques disclosed herein may be used to detect that two or more items have been grasped when only a single items was expected. For example, multiple items may have been grasped in error, or an adjacent item may be stuck to an item that has been grasped.

Figure 7C:
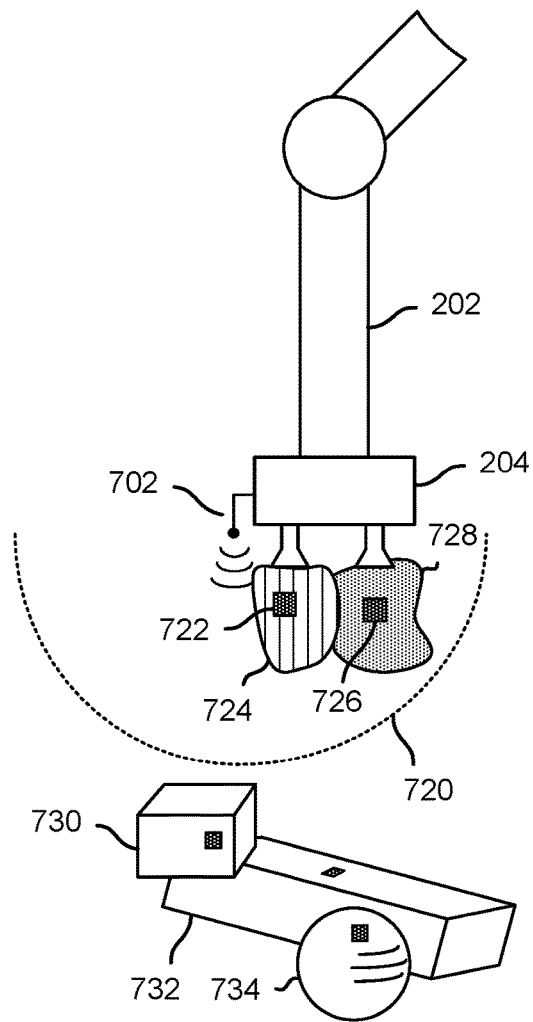
FIG. 7C is a diagram illustrating an embodiment of a robotic singulation system having an end effector-based sensor.

FIG. 7C is a diagram illustrating an embodiment of a robotic singulation system having an end effector-based sensor. In the example shown, end effector 204 of robotic arm 202 has been used to grasp a first item 724 with a first ID tag 722 attached thereto. However, in this example, by accident a second item 728 with ID tag 726 has been grasped as well. For example, the end effector may have been placed in proximity to item 724, but nearby item 728 may have been grasped when the vacuum was applied to the suction cups comprising end effector 704, resulting in both items 724 and 728 being grasped. In the example shown, the items 724, 728 have been lifted up and away from the pile comprising the remaining items 730, 732, 734. The ID tags 722 and 726 both are in the read range of RF tag reader 702. In various embodiments, reading two tags in the circumstance as shown in FIG. 7C and describe above would result in an error being generated and associated exception handling being performed, such as replacing the items 724, 728 in the pile and trying again or placing the items 724, 728 in a bin or other receptacle from which a human or other robotic user may pick them individually and place the singly on the singulation conveyance.

Figure 7D:
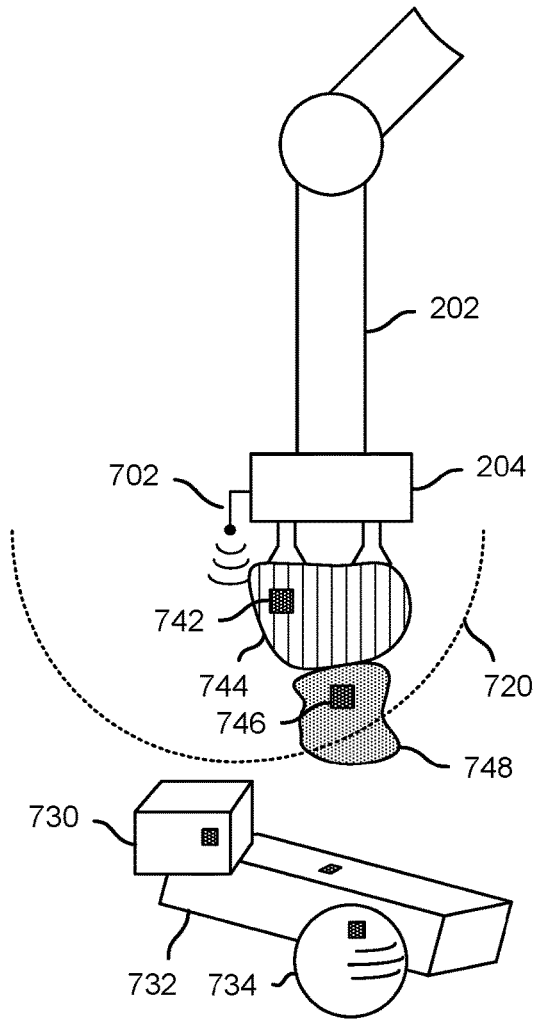
FIG. 7D is a diagram illustrating an embodiment of a robotic singulation system having an end effector-based sensor.

FIG. 7D is a diagram illustrating an embodiment of a robotic singulation system having an end effector-based sensor. In the example shown in FIG. 7D, the end effector 204 has been used to grasp only the single item 744 having ID tag 742 affixed thereto. However, a second item 748 having ID tag 746 affixed to it is in this example stuck to item 744. As a result, both items 744, 748 have been lifted from the pile and their respective ID tags 742, 746 are within read range of the RF tag reader 702. In various embodiments, upon reading two tags (742, 746) when only one tag (i.e., 742) was expected would result in exception handling, such as placing the items 744, 748 in a bin or other receptacle from which a human or other robotic user may pick them individually and place the singly on the singulation conveyance.

Figure 7E:
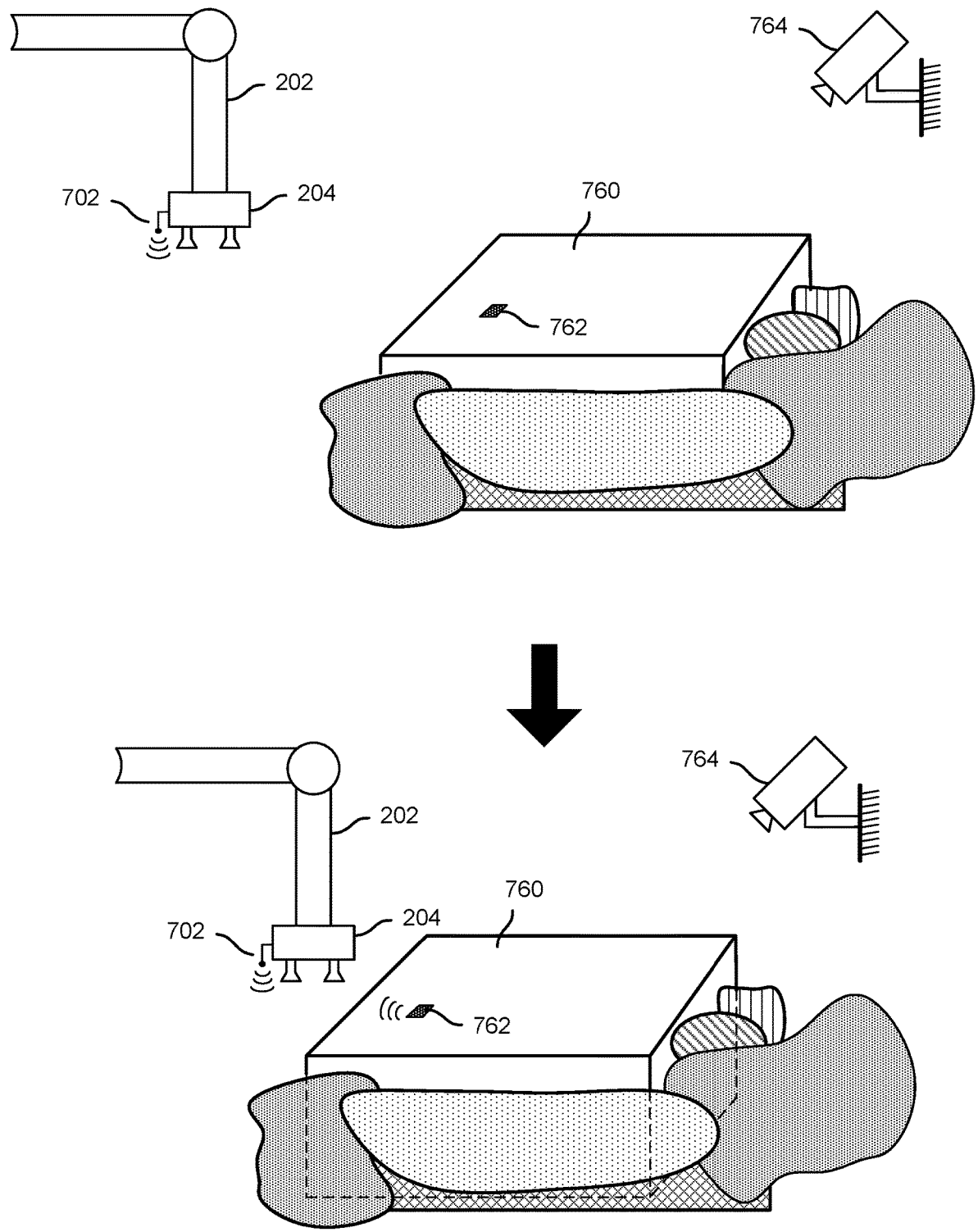
FIG. 7E is a diagram illustrating an embodiment of a robotic singulation system having an end effector-based sensor.

FIG. 7E is a diagram illustrating an embodiment of a robotic singulation system having an end effector-based sensor. In the example shown, in the upper view the camera 764 may have generated images from which an incomplete view and identification of the object 760 and its attributes (e.g., dimensions, weight, etc.) may be obtained. In this example, only the top portion of item 760 is visible to camera 764. Identifying labels, markings, optical codes, etc. may be obscured by the adjacent items as shown. In the lower image, the robotic arm 702 has been used to position the end effector 204 and RF tag reader 702 in closer proximity to the ID tag 762 affixed to the upper surface of the item 760, in this example. In the example shown, the identified read from ID tag 762 has been used to determine the dimensions and/or other attributes of the item 760, as indicated by the dashed lines, showing the full extent of the item 760, including the portions obscured visually by adjacent items. In various embodiments, the more complete identification of the item 760 and its attributes may be used to determine and execute a successful strategy to use the end effector 704 to grasp the item 760 and use the robotic arm 702 to move the item to a destination, such as a specific, identified location on segmented conveyor 208 of FIG. 2A. For example, one or more of the vacuum to be applied to the suction cups of end effector 204; force to be applied by robotic arm 202; and trajectory through which to move the item 760 (e.g., to avoid colliding with other items and structures in the workspace) may be determined based at least in part on an identifier and/or other information read from the ID tag 762 and/or looked up based on information read from the ID tag 762.

FIG. 8A is a flow diagram illustrating an embodiment of a process to use an end effector-based sensor to perform singulation. In various embodiments, the process 800 of FIG. 8A is performed by a control computer, such as control computer 212 of FIG. 2A. In the example shown, an interrogation or "read" signal is sent at 802. For example, a control computer, such as control computer 212 of FIG. 2A, may cause an RFID tag reader, such as tag reader 702 of FIG. 2A, to emit an interrogation or read signal to read passive RFID tags on one or more packages or other objects in the vicinity of the tag reader 702. At 804, responsive signals, if any, emitted by one or more ID tags in response to the read signal sent at 802 are received and processed. If at 806 it is determined that no object identifier has been read, e.g., there is no responsive signal or no identifier could be determined from the signal, then at 808 the robotic arm may be manipulated under robotic control to reposition one or both of the robotic end effector and associated tag reader, such as tag reader 702, and one or more objects in the workspace. For example, at 808, the robotic arm may be used to position the end effector and associated tag reader nearer to an object the ID tag of which is desired to be read. By way of further example, at 808, the robotic arm may be used to reposition an object the ID tag of which is desired to be read, such as to lift or drag the object clear of nearby adjacent objects and/or otherwise to place the object in a position to better enable its ID tag to be read.

If an object identifier is reads (806), the identifier is used at 810 to look up one or more attributes of the object. Examples of object attributes that may be looked up at 810, in various embodiments, include without limitation, the object dimensions, weight, object type, packaging type, rigidity, and destination. At 812, the object attributes determined at 810 are used to determine and execute a plan/strategy tor grasp, move, and place the object. For example, a grasp strategy to grasp the object using the end effector of the robotic arm may be determined, along with a trajectory to a destination location, such as a specific corresponding location on a segmented conveyor or other singulation structure.

Successive iterations of the process 800 are performed until it is determined at 814 that no further objects are to be processed, e.g., all objects have been handled or the system is paused or shutdown.

FIG. 8B is a flow diagram illustrating an embodiment of a process to use an end effector-based sensor to detect the presence of more than one item. In various embodiments, the process 820 of FIG. 8B is performed by a control computer, such as control computer 212 of FIG. 2A. In various embodiments, the process 820 is performed to detect conditions in which two or more items have been grasped (as in the example shown in FIG. 7C) or if an item is stuck to an item that has been grasped (as in the example shown in FIG. 7D). In the example shown in FIG. 8B, at 822 a next object is grasped and moved away from the pile (e.g., chute 206). At 824, any ID tag(s) within range is read. If at 826 it is determined that more than one ID tag has been read, indicating more than one object is within the read range, then at 828 exception handling is performed, such as placing the object(s) in an exception handling bin or other receptacle for human intervention or returning the object(s) to the pile and trying again. If it is determined at 826 that only a single ID tag has been read, at 830 the robotic system continues to use the robotic arm to move the object along the planned trajectory and the item is placed at an intended destination. Successive iterations of process 820 are performed until an indication is received at 832 that processing is done, e.g., all objects have been placed or the system is paused or stopped.

Figure 8C:
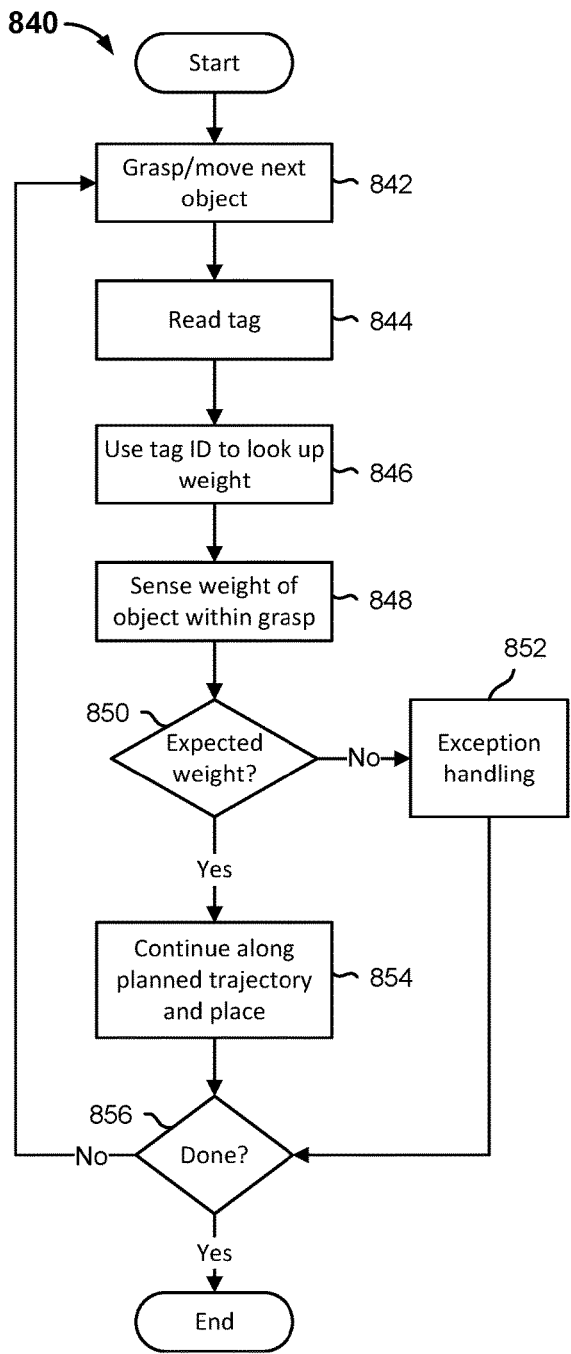
FIG. 8C is a flow diagram illustrating an embodiment of a process to use an end effector-based sensor to detect a damaged item.

FIG. 8C is a flow diagram illustrating an embodiment of a process to use an end effector-based sensor to detect a damaged item. In various embodiments, the process 840 of FIG. 8C is performed by a control computer, such as control computer 212 of FIG. 2A. In various embodiments, the process 820 is performed to detect that an object is damaged. In the example shown, at 842, a next object to be picked and placed is grasped and moved toward its destination. At 844, the ID tag of the object is read and at 846 the object identifier encoded in the tag is used to look up an expected weight of the object. At 848, force sensors located in a wrist or similar structure by which the end effector 204 is couple mechanically to the robotic arm 202 are used to sense the weight of the object. At 850, the sensed weight is compared to the expected weight and if they do not match exception handling is performed at 852, such as placing the object in a bin or other receptacle for a human to check for and/or repair any damage. If it is determined at 850 that the sensed weight is the same as the expected weight, at 854 the object is continued to be moved along the planned trajectory and placed at/in its destination, such as a specific location on the segmented conveyor or other singulation structure. Successive iterations of process 840 are performed until an indication is received at 856 that processing is done, e.g., all objects have been placed or the system is paused or stopped.

In some embodiments, a special tag may be affixed to an object, e.g., by an upstream human and/or robotic worker, to indicate the object has been observed or otherwise determined to be damaged, e.g., crushed, seal broken, breach of object packaging. Downstream, an end effector-based tag reader, such as tag reader 702, may be used to read the special tag, e.g., right before or shortly after grasping the object, and may update the planned trajectory and placement of the object accordingly, such as by moving the object through the trajectory more slowly to reduce the risk of further damage and/or updating the trajectory and/or placement plan to place the object carefully in an exception handling destination, such as a bin or other receptacle, for special handling, such as by a human worker.

Figure 9:
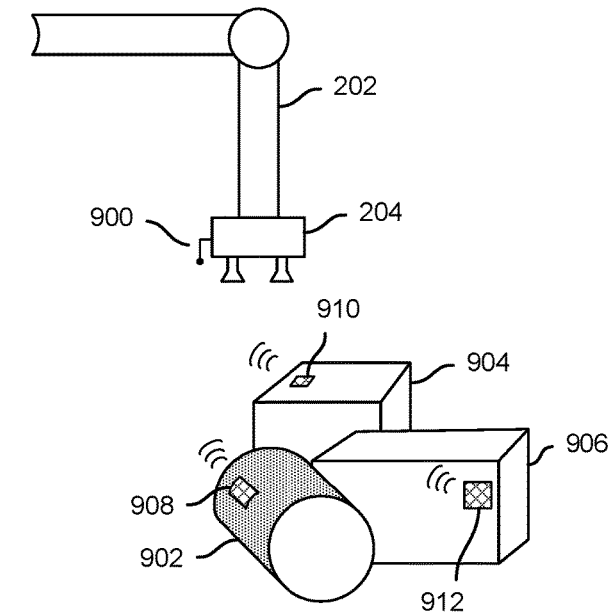
FIG. 9 is a diagram illustrating an embodiment of a robotic singulation system having an end effector-based sensor.

FIG. 9 is a diagram illustrating an embodiment of a robotic singulation system having an end effector-based sensor. In the example shown, end effector 204 of robotic arm 202 has integrated therewith and/or mounted thereon an active RF tag reader/receiver 900. Each of a plurality of objects 902, 904, 906 has a corresponding active RFID tag 908, 910, 912 that emits actively a signal that includes an object identifier of the object to which the active RFID tag is affixed. Active RFID tags typically are powered by an onboard battery and actively broadcast a signal that encodes information, such as an object identifier and/or one or more attributes of the object, such as object weight, object type, object dimensions, and object destination.

In various embodiments, a robotic singulation system as disclosed herein is configured to use active RFID tag reader 900 to receive and decode signals provided by active RFID tags, such as tags 908, 910, 912 in the example shown, and to use object identifiers and/or attributes encoded in such signals to perform singulation, as disclosed herein, such as to determine and execute a grasp strategy, select and plan a trajectory to a destination on a segmented conveyor or other singulation structure, and associate an object and/or a location on a segmented conveyor or other singulation structure with a destination to which the object is to be delivered.

Figure 10:
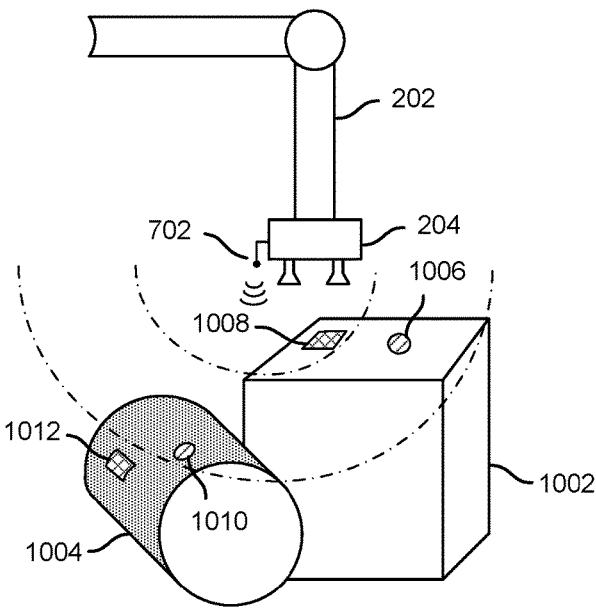
FIG. 10 is a diagram illustrating an embodiment of a robotic singulation system having an end effector-based sensor.

FIG. 10 is a diagram illustrating an embodiment of a robotic singulation system having an end effector-based sensor. In the example shown, each of a plurality of objects 1002, 1004 includes a relatively longer-range readable ID tag 1006, 1010 and a relatively shorter-range readable ID tag 1008, 1012. In the position shown, passive RFID tag reader 702 mounted on end effector 204 of robotic arm 202 can read longer-range tags 1006 and 1010 on objects 1002 and 1004, respectively, and has been moved in a position that enables the shorter-range tag 1008 but not the tag 1012 to be read.

In various embodiments, a robotic singulation system as disclosed herein is configured to read longer-range ID tags, e.g., by emitting a read signal of a frequency and energy level sufficient to read longer-range ID tags from a first, relatively longer distance. In some embodiments, reading longer-range tags enables the system to determine which set of objects are in the general vicinity in the workspace. For example, the system may look up and preload object attributes for objects in the workspace. One or more attributes may be used in connection with other information, e.g., information derived from images of the objects in the workspace, to determine at a first level which object is which and to make an initial plan to move objects from the workspace to corresponding singulation destinations. The system may then move the end effector 204 and integrated tag reader 702 to a position in closer proximity to a given object, such as object 1002 in the example shown in FIG. 10, to verify the identify and/or attributes of the object at least in part by reading the shorter-range ID tag 1008. Similarly, the system could move the end effector 204 and tag reader 702 to the left, from the position as shown in FIG. 10, to be in a position to read shorter-range tag 1012 but not tag 1008. In this way, the system can learn more specifically and/or with greater confidence the identity, attributes, location, and pose of the respective objects in the workspace, and can make and/or modify its plan to grasp and move objects accordingly.

Figure 11:
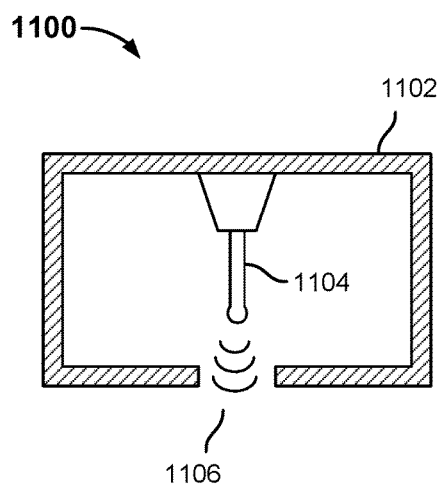
FIG. 11 is a diagram illustrating an embodiment of an end effector-based sensor.

FIG. 11 is a diagram illustrating an embodiment of an end effector-based sensor. In the example shown, sensor 1100 includes a housing 1102 in which an RFID tag reader 1104 is housed. The antenna of tag reader 1104 is positioned opposite and at a short distance to an opening 1106 in housing 1102. In various embodiments, the housing 1102 is constructed of a material that attenuates an RF signal emitted by tag reader 1104, such that an unattenuated signal, which would be stronger and have a longer read range, may be focused in a narrower beam emerging from opening 1106 in housing 1102. Likewise, return signals from a wider area may be attenuated by housing 1102, decreasing the effective read range and/or area of the sensor 1100.

In various embodiments, read range and/or coverage area may be controlled by adjusting the frequency and/or power of transmission of the read signal by a tag reader, such as tag reader 702 of FIG. 7A or tag reader 1104 of FIG. 11.

In some embodiments, a robotic singulation system as disclosed herein adjusts tag reader power dynamically to adjust read range. For example, a first, relatively higher power may be used to read tags in a general vicinity or area while a lower power may be used to read tags only in very close proximity.

Figure 12:
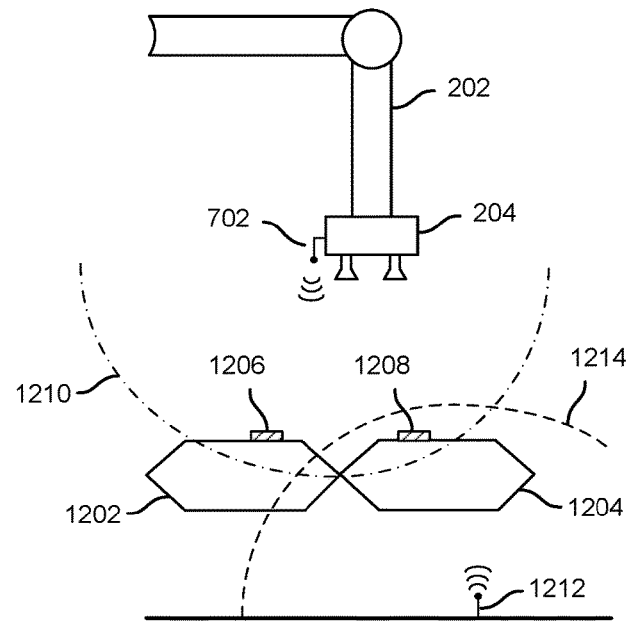
FIG. 12 is a diagram illustrating an embodiment of a robotic singulation system having an end effector-based sensor used in conjunction with one or more other sensors.

FIG. 12 is a diagram illustrating an embodiment of a robotic singulation system having an end effector-based sensor used in conjunction with one or more other sensors. In the example shown, tag reader 702 on end effector 204 is used in conjunction with a tag reader 1212 positioned statically in the workspace to resolve ambiguities and/or to read tags that may not be readable using tag reader 702 on end effector 204, for example tags that are on the bottom side of an object buried deep in a pile.

In some cases, similar packages in close proximity may be identified initially by a computer vision system as comprising a single object. For example, video segmentation may incorrectly, at first, identify objects 1202 and 1204 of FIG. 12 as comprising a single object. In various embodiments, tag reader 702 may be used to detect that in fact two distinct objects 1202, 1204 are present, in this example by reading ID tags 1206 and 1208. Fixed tag reader 1212 may be used to determine which is which, and the information used by the robotic system to update its view of the workspace/scene and its plan to grasp the objects 1202, 1204.

In the example shown in FIG. 12, end effector 204 has been positioned such that tag reader 702 is able to read tags 1206 and 1208 on objects 1202 and 1204, respectively. The system is able to use the fact that fixed tag reader 1212 can read only tag 1208 on object 1204 to identify the object 1204 on the right side of the workspace as shown in FIG. 12 as being associated with the object identifier of object 1204. Tag 1206 of object 1202 is not readable by tag reader 1212, enabling the object 1202 to be identified as the object on the left side as shown. The fixed tag reader 1212 is used, therefore, to distinguish between the two objects 1202, 1204, despite their similarity in size, shape, packaging, etc.

Figure 13:
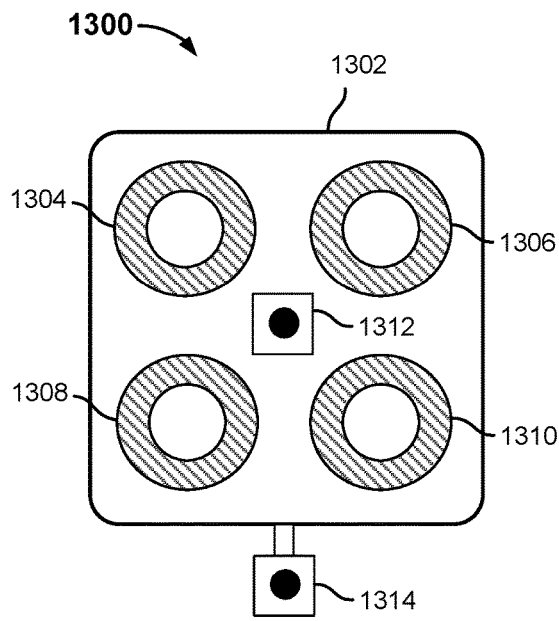
FIG. 13 is a diagram illustrating a bottom view of an embodiment of an end effector comprising an effector-based sensor.

FIG. 13 is a diagram illustrating a bottom view of an embodiment of an end effector comprising an effector-based sensor. In the example shown, end effector 1300 includes a body 1302 on which robotically activated suction cup style grippers 1304, 1306, 1308, and 1310 are mounted. A first downward looking camera (or other sensor) 1312 is mounted in the middle of body 1302, between the suction cups 1304, 1306, 1308, and 1310, and a second downward looking camera (or other sensor) 1314 is mounted on a side of body 1302. In various embodiments, cameras mounted in the workspace may be used to perform a first level segmentation and identification of objects in the workspace, and the robotic system may move the end effector 1300 to closer proximity to an object to use camera 1312 and/or camera 1314 to more specifically identify an object and/or its attributes, such as to read an QR or other optical code printed on and/or affixed to the object or its packaging.

Figure 14:
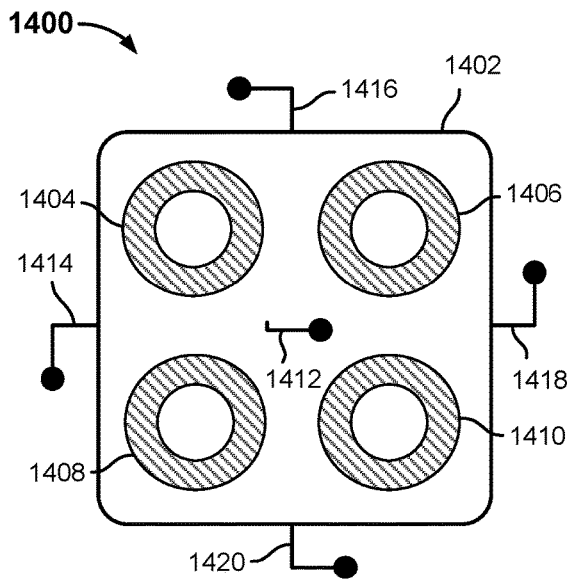
FIG. 14 is a diagram illustrating a bottom view of an embodiment of an end effector comprising an effector-based sensor.

FIG. 14 is a diagram illustrating a bottom view of an embodiment of an end effector comprising an effector-based sensor. In the example shown, end effector 1400 includes a body 1402 on which robotically activated suction cup style grippers 1404, 1406, 1408, and 1410 are mounted. An array of tag readers (or other sensors) comprising a central tag reader 1412 and peripherally mounted tag readers 1414, 1416, 1418, and 1420 are arranged on the sides of the body 1402, as shown.

In various embodiments, a robotic singulation system as disclosed herein uses the sensor array of end effector 1400 to determine the object identifier and/or attributes of an object. In some embodiments, the system uses that the fact that some of the sensors can read a tag while others cannot, and/or the respective signal levels received by the respective sensors, to determine a direction in which an object is located relative to the end effector 1400. For example, if an ID tag can be read only by tag reader 1414 (or tag reader 1414 receives a strong signal while tag readers 1412, 1416, and 1420 receive weaker signals and tag reader 1418 receives no signal), the system may conclude the object is located to the left of the end effector 1400 as shown.

In some embodiments, the tag readers 1412, 1414, 1416, 1418, and 1420 may be operated as a phase array antenna, improving the fidelity and/or range at which RFID tags can be read and/or enabling a direction from which a responsive signal is received to be determined. In various embodiments, the direction information may be used to steer the end effector 1400 to a position nearer to an object of interest, such as to perform further or more specific identification and/or characterization and/or to determine and implement a plan and strategy to grasp and move the object to an associated destination.

In various embodiments, techniques disclosed herein are used to safely and efficiently pick and place heterogenous items from a disordered pile and/or flow, such as to grasp items from a chute or other receiver and move them each singly to a corresponding singulation destination, such as a specific location on segmented conveyor or other singulation structure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a communication interface; and
 a processor coupled to the communication interface and configured to:
  receive from a computer vision system video segmentation data indicating an identified object of interest in a workspace;
  manipulate a robotic arm to move a first sensor to a position such that the identified object of interest is within a read range of the sensor;
  receive via the communication interface a first sensor data read by the first sensor, the first sensor data comprising a first data element associated with a first object and a second data element associated with a second object;
  receive via the communication interface a second sensor data read by a second sensor positioned statically in the workspace, the second sensor data comprising the second data element associated with the second object but not the first data element associated with the first object;
  determine based on first sensor data and the second sensor data that the identified object comprises both the first object and the second object;

update a view of the workspace, based at least in part on said determination, to determine an updated view in which the first object and the second object are separately identified;

use the first data element to determine an attribute of the first object; and use the determined attribute of the first object and the updated view to determine a plan to grasp and move the first object.

2. The system of claim 1, wherein the first sensor is integrated with an end effector disposed at a free moving end of the robotic arm.

3. The system of claim 2, wherein the processor is configured to move the first sensor to the position by moving the end effector to or near the position.

4. The system of claim 3, wherein the processor is further configured to change an orientation of the end effector with respect to the object to facilitate movement of the sensor to generate the sensor data.

5. The system of claim 1, wherein the first data element comprises an object identifier associated with the first object.

6. The system of claim 5, wherein the processor is further configured to use the object identifier to look up the attribute.

7. The system of claim 1, wherein the attribute comprises one or more of the following: a weight of the object, an object type, a dimension of the object, a center of gravity, a packaging type, a destination, and a condition of the object.

8. The system of claim 1, wherein the first sensor comprises a radio-frequency (RF) tag reader and the sensor data is generated at least in part by using the sensor to read an RF tag associated with the object.

9. The system of claim 8, wherein the RF tag comprises a passive RF tag and the tag reader is configured to read the passive RF tag by emitting a read RF signal to which the passive RF tag is responsive.

10. The system of claim 8, wherein the RF tag comprises an active RF tag configured to emit an active RF signal in which the sensor data is encoded and the tag reader is configured to receive and decode the active RF signal to obtain the sensor data.

11. The system of claim 8, wherein the first sensor comprises a phased array antenna and the processor is further configured to operate the first sensor in a manner that uses the phased array antenna to determine direction information of the RF tag associated with the first object, and the processor is further configured to control the movement of an end effector based on the direction information to steer the end effector to a position nearer the first object.

12. A method, comprising:

receiving from a computer vision system video segmentation data indicating an identified object of interest in a workspace;

manipulating a robotic arm to move a first sensor to a position such that the identified object of interest is within a read range of the sensor;

receiving via a communication interface a first sensor data read by the first sensor, the first sensor data comprising a first data element associated with a first object and a second data element associated with a second object;

receiving via the communication interface a second sensor data read by a second sensor positioned statically in the workspace, the second sensor data comprising the second data element associated with the second object but not the first data element associated with the first object;

determining based on first sensor data and the second sensor data that the identified object comprises both the first object and the second object;

updating a view of the workspace, based at least in part on said determination, to determine an updated view in which the first object and the second object are separately identified;

using the first data element to determine an attribute of the first object; and using the determined attribute of the first object and the updated view to determine a plan to grasp and move the first object.

13. A computer program product embodied in a non-transitory computer readable medium, comprising computer instructions for:

receiving from a computer vision system video segmentation data indicating an identified object of interest in a workspace;

manipulating a robotic arm to move a first sensor to a position such that the identified object of interest is within a read range of the sensor;

receiving via a communication interface a first sensor data read by the first sensor, the first sensor data comprising a first data element associated with a first object and a second data element associated with a second object;

receiving via the communication interface a second sensor data read by a second sensor positioned statically in the workspace, the second sensor data comprising the second data element associated with the second object but not the first data element associated with the first object;

determining based on first sensor data and the second sensor data that the identified object comprises both the first object and the second object;

updating a view of the workspace, based at least in part on said determination, to determine an updated view in which the first object and the second object are separately identified;

using the first data element to determine an attribute of the first object; and using the determined attribute of the first object and the updated view to determine a plan to grasp and move the first object.

* * * * *